United States Patent
Chiba

(10) Patent No.: US 9,430,862 B2
(45) Date of Patent: Aug. 30, 2016

(54) RASTER IMAGE THREE-DIMENSIONALIZATION PROCESSING DEVICE, RASTER IMAGE THREE-DIMENSIONALIZATION METHOD, AND RASTER IMAGE THREE-DIMENSIONALIZATION PROGRAM

(71) Applicant: ASIA AIR SURVEY CO., LTD., Shinjuku-ku, Tokyo (JP)

(72) Inventor: Tatsuro Chiba, Kanagawa (JP)

(73) Assignee: ASIA AIR SURVEY CO., LTD., Tokyo (JP)

( * ) Notice: Subject to any disclaimer, the term of this patent is extended or adjusted under 35 U.S.C. 154(b) by 152 days.

(21) Appl. No.: 14/566,008

(22) Filed: Dec. 10, 2014

(65) Prior Publication Data

US 2015/0091901 A1    Apr. 2, 2015

Related U.S. Application Data

(63) Continuation of application No. PCT/JP2013/066469, filed on Jun. 14, 2013.

(30) Foreign Application Priority Data

Jun. 14, 2012 (JP) .................................. 2012-134869
Jun. 12, 2013 (JP) .................................. 2013-123850

(51) Int. Cl.
*G06T 15/00* (2011.01)
*G06T 15/50* (2011.01)
(Continued)

(52) U.S. Cl.
CPC .............. *G06T 11/60* (2013.01); *G06T 11/001* (2013.01); *G06T 15/00* (2013.01); *H04N 13/0257* (2013.01)

(58) Field of Classification Search
CPC .................. G06T 17/00; G06T 17/05; G06T 2207/10028; G06T 2207/10032; G06T 2207/20172; G06T 2207/20212; G06T 2207/30181
See application file for complete search history.

(56) References Cited

U.S. PATENT DOCUMENTS 5,067,098 A * 11/1991 Moellering ........... G06T 15/506
                                                   345/419
6,448,969 B1 * 9/2002 Minakawa ......... G01C 21/3635
                                                   345/421
(Continued)

FOREIGN PATENT DOCUMENTS

CN        101763659       6/2010
CN        101916397       12/2010
(Continued)

OTHER PUBLICATIONS

Chiba et al., "Red Relief Image Map: New Visualization Method for Three Dimensional Data", 2008, The International Archives of the Photogrammetry, Remote Sensing and Spatial Information Sciences vol. XXXVII, Part B2. Beijing, pp. 1071-1076.*

(Continued)

*Primary Examiner* — Jacinta M Crawford
*Assistant Examiner* — Phong Nguyen
(74) *Attorney, Agent, or Firm* — Greenblum & Bernstein, P.L.C.

(57) ABSTRACT

The computer main body includes a mesh size matching unit, a shading map generator, a red three-dimensional image generator, a raster image reader, a gradient reader, a floating-sinking degree reader, a first HSV converter, a mesh designator, a shading data reader, a second HSV converter, a hue reader, a first synthesis unit, a second synthesis unit, a third synthesis unit, an image output unit, a register, a color adjuster and the like, and causes the raster image RSGi having an elevation value to be viewed three-dimensionally.

8 Claims, 38 Drawing Sheets

(51) Int. Cl.
*G06T 15/60* (2006.01)
*G09G 5/00* (2006.01)
*G09G 5/02* (2006.01)
*G06T 11/60* (2006.01)
*H04N 13/02* (2006.01)
*G06T 11/00* (2006.01)

(56) References Cited

U.S. PATENT DOCUMENTS

| | | | | |
|---|---|---|---|---|
| 7,095,423 | B2* | 8/2006 | Cosman | G06T 17/05 345/629 |
| 7,310,606 | B2* | 12/2007 | Nemethy | G01C 7/02 345/419 |
| 7,411,587 | B2* | 8/2008 | Lee | G06T 17/05 345/419 |
| 7,764,282 | B2 | 7/2010 | Chiba | |
| 7,876,319 | B2 | 1/2011 | Chiba | |
| 8,031,193 | B1* | 10/2011 | Henderson | G06T 15/80 345/426 |
| 8,547,389 | B2* | 10/2013 | Hoppe | G06T 5/50 345/589 |
| 2006/0038817 | A1* | 2/2006 | Langer | G06T 15/04 345/426 |
| 2006/0262117 | A1 | 11/2006 | Chiba | |
| 2007/0146364 | A1* | 6/2007 | Aspen | G01C 23/005 345/426 |
| 2010/0118053 | A1* | 5/2010 | Karp | G01C 11/06 345/630 |
| 2010/0231584 | A1* | 9/2010 | Chiba | G09B 29/12 345/419 |
| 2011/0148866 | A1* | 6/2011 | Chu | G06T 15/04 345/419 |
| 2011/0202510 | A1 | 8/2011 | Salemann | |

FOREIGN PATENT DOCUMENTS

| | | |
|---|---|---|
| JP | 2005-174354 | 6/2005 |
| JP | 3670274 | 7/2005 |
| JP | 2007-048185 | 2/2007 |
| JP | 2008-111724 | 5/2008 |
| JP | 2011-048495 | 3/2011 |
| JP | 2012-053191 | 3/2012 |

OTHER PUBLICATIONS

Kennelly, "Hillshading of Terrain Using Layer Tints with Aspect-Variant Luminosity", Mar. 2004, Cartography and Geographic Information Science, vol. 31, No. 2, pp. 67-77.*

Razak et al., "Airborne laser scanning of forested landslides characterization: Terrain model quality and visualization", 2011, Geomorphology 126 (2011), pp. 186-200.*

Zaksek et al., "Sky-View Factor as a Relief Visualization Technique", 2011, Remote Sensing ISSN 2072-4292, pp. 398-415.*

Tatsuro Chiba, "Terrain representation technology—Introduction of Red three—dimensional map-", in Proceedings of FY2012 Symposium and Special lecture "Recent Measurement Technology of Terrain and Application to Engineering Geology", Japan Society of Engineering Geology, with English language Abstract, Jun. 1, 2012, pp. 30-37.

International Search Report, mailed Jul. 16, 2013, for International Application No. PCT/JP2013/066469.

China Office Action, mailed Apr. 18, 2016, in the counterpart Chinese Patent Application.

* cited by examiner

GEOLOGICAL MAP CHGi — LAND FORM IS ALMOST UN-READABLE GEOLOGICAL MAP KNOWLEDGE IS NECESSARY FOR UNDERSTANDING

BRIGHT YELLOW — RED — DARK YELLOW

TYPICAL GEOLOGICAL MAP
LAND FORM IS EXPRESSED BY CONTOUR LINES
AND LAND FORM IS EXPRESSED BY COLOR

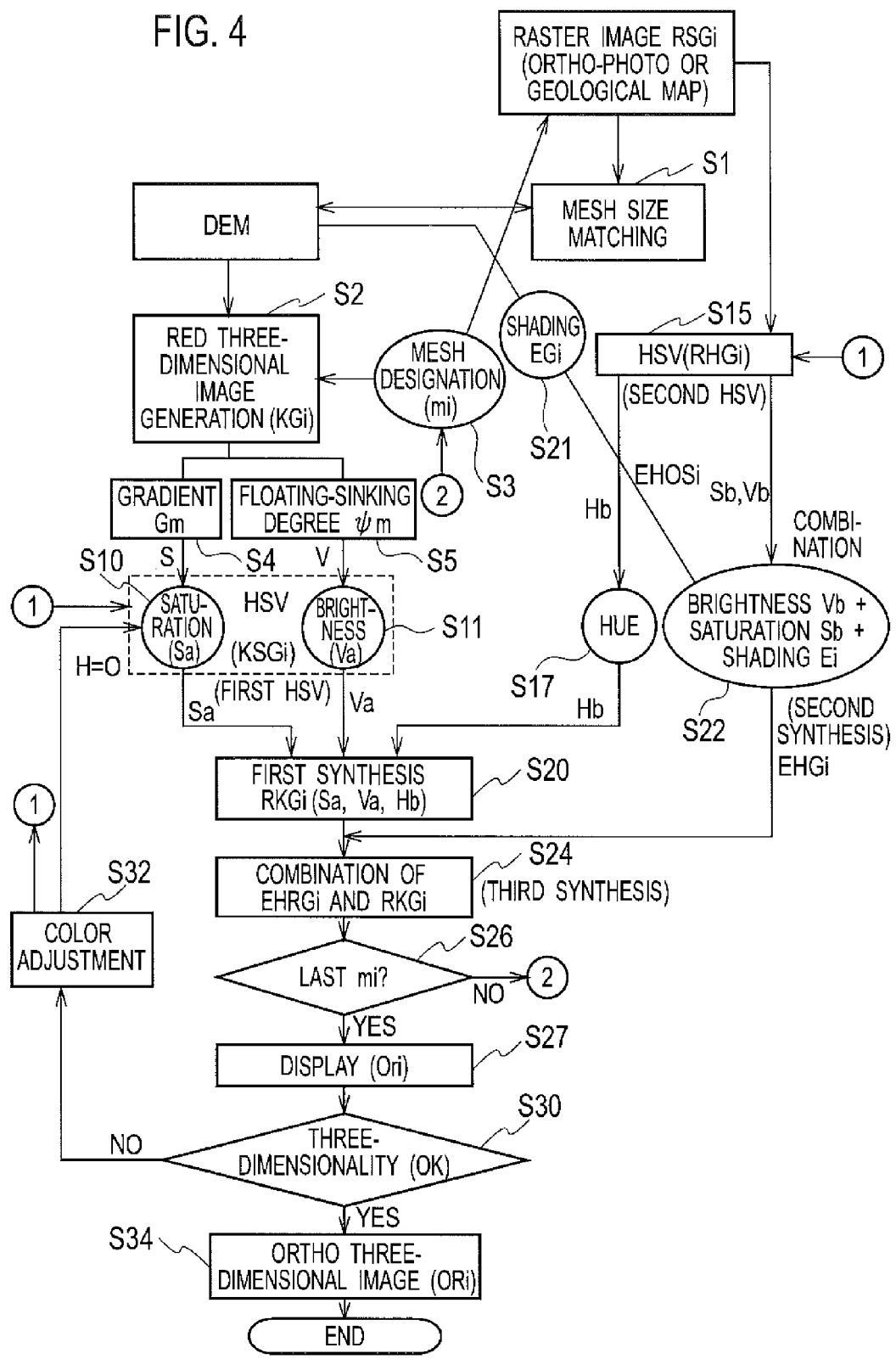

DEM DATA

DEM DATA 21

| MESH NUMBER mi | X COORDINATE (LONGITUDE: Xi) | Y COORDINATE (LATITUDE: Yi) | Z COORDINATE (GROUND ELEVATION VALUE: Zgi) |
|---|---|---|---|
| 1 | X1 | Y1 | Zg1 |
| 2 | X2 | Y2 | Zg2 |
| ⋮ | ⋮ | ⋮ | ⋮ |
| n | Xn | Yn | Zgn |

FIG. 6A
FIG. 6B
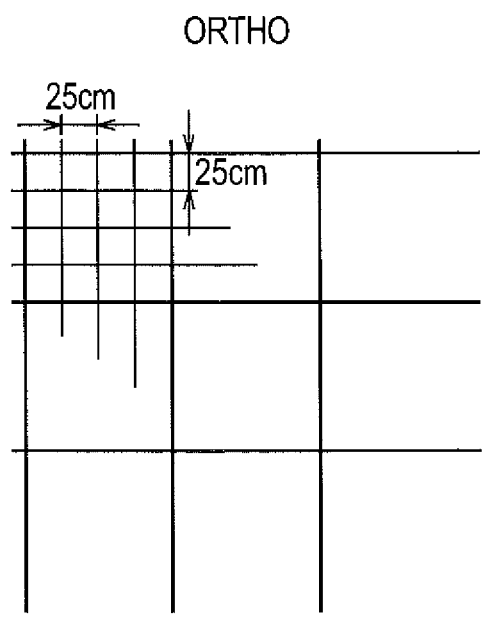
ORTHO
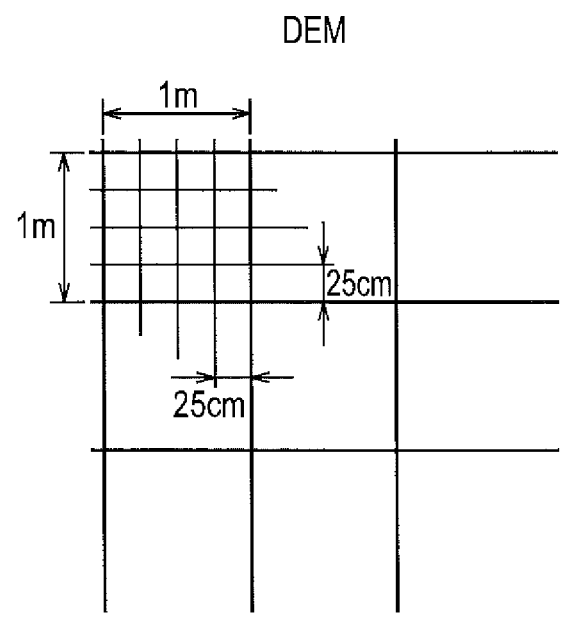
DEM

FIG. 7 UNDERGROUND OPENING MAP

ABOVE-GROUND OPENING MAP

RIDGE-VALLEY DEGREE

FIG. 12

FIRST HSV CONVERTER

| MESH NUMBER mi | Ha | Sa | Va |
|---|---|---|---|
| 1 | - | Gm Sa1 | 4m Va1 |
| 2 | - | Gm Sa2 | 4m Va2 |
| ⋮ | ⋮ | ⋮ | ⋮ |
| n | - | San | Van |

RASTER THREE-DIMENSIONALIZED GEOLOGICAL MAP

RELATIONSHIP OF LAND FORM AND GEOLOGICAL FEATURES
CAN BE UNDERSTOOD INTUITIVELY

RED-COLOR AND RASTER-HUE COMPOSITE IMAGE RKGi

FIG. 18A

ORTHO-PHOTO IMAGE OSGi

| MESH NUMBER mi | | X COORDINATE (LONGITUDE: Xi) | Y COORDINATE (LATITUDE: Yi) | R VALUE | G VALUE | B VALUE | | |
|---|---|---|---|---|---|---|---|---|
| $OS_1$ | 1 | X1 | Y1 | R1 | G1 | B1 | | |
| $OS_2$ | 2 | X2 | Y2 | R2 | G2 | B2 | | |
| . | | . | . | R3 | G3 | B3 | | |
| . | | . | . | | | | | |
| | n | Xn | Yn | Rn | Gn | Bn | | |

FIG. 18B

SHADING IMAGE (EGi)

| MESH NUMBER mi | | X COORDINATE (LONGITUDE: Xi) | Y COORDINATE (LATITUDE: Yi) | GRAY-SCALE VALUE Gri | | | |
|---|---|---|---|---|---|---|---|
| $e_1$ | 1 | X1 | Y1 | Gr1 | | | |
| $e_2$ | 2 | X2 | Y2 | Gr2 | | | |
| . | | . | . | Gr3 | | | |
| . | | . | . | | | | |
| | n | Xn | Yn | Grn | | | |

FIG. 19

RED THREE-DIMENSIONAL IMAGE KGi

| MESH NUMBER mi (GRID NUMBER i) | X COORDINATE (LONGITUDE: Xi) | Y COORDINATE (LATITUDE: Yi) | Z COORDINATE (GROUND ELEVATION VALUE Zgj) | RESEARCH RANGE R | GRID SPACING Lm | ABOVE-GROUND OPENING $\theta i$ | COLOR VALUE |
|---|---|---|---|---|---|---|---|
| 1 | X1 | Y1 | Zg1 | R1 | Lm1 | $\theta 1$ | |
| 2 | X2 | Y2 | Zg2 | R1 | Lm1 | $\theta 2$ | |
| . | . | . | . | R1 | Lm1 | $\theta 3$ | |
| . | . | . | . | . | . | | |
| n | Xn | Yn | Zgn | R1 | Lm1 | | |

| UNDER-GROUND OPENING | COLOR VALUE | FLOATING-SINKING DEGREE $\psi m$ | COLOR VALUE | GRADIENT Gm | COLOR VALUE |
|---|---|---|---|---|---|
| | GRAYSCALE | | | | RED COLOR ⇔ WHITE |

ORTHO-PHOTO
OVERLAPPING WITH MAP
BUT POOR THREE-DIMENSIONALITY

FIG. 22A
ORTHO-PHOTO IMAGE OSGi    COLOR VALUE
| PIXEL NUMBER i | X COORDINATE (LONGITUDE: Xi) | Y COORDINATE (LATITUDE: Yi) | R VALUE | G VALUE | B VALUE | | |
|---|---|---|---|---|---|---|---|
| $OS_1$ 1 | X1 | Y1 | R1 | G1 | B1 | | |
| $OS_2$ 2 | X2 | Y2 | R2 | G2 | B2 | | |
| . | . | . | R3 | G3 | B3 | | |
| . | . | . | | | | | |
| n | Xn | Yn | Rn | Gn | Bn | | |
FIG. 22B
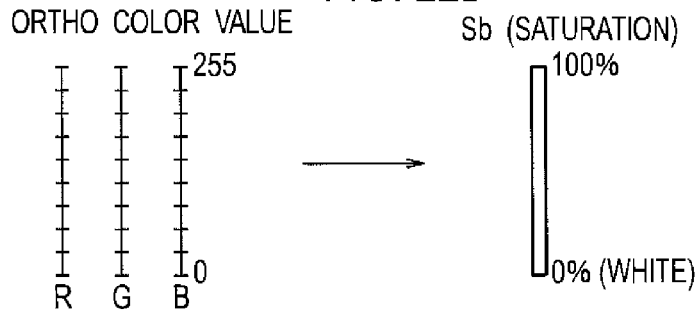
FIG. 22C
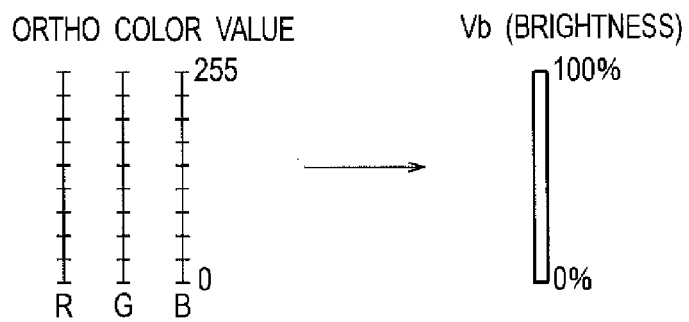
FIG. 22D
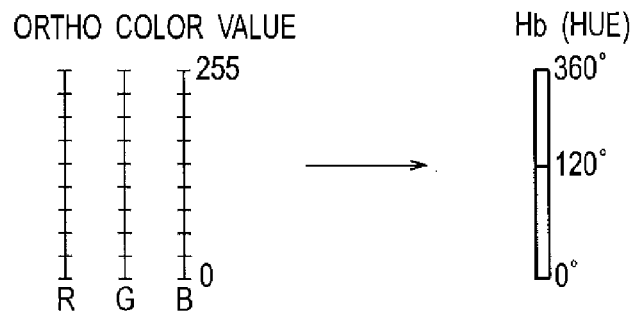

FIG. 23A

RED THREE-DIMENSIONAL IMAGE KGi

| GRID NUMBER i | | X COORDINATE (LONGITUDE: Xi) | Y COORDINATE (LATITUDE: Yi) | Z COORDINATE (GROUND ELEVATION VALUE: Zgi) |
|---|---|---|---|---|
| K1 | 1 | X1 | Y1 | Zg1 |
| K2 | 2 | X2 | Y2 | Zg2 |
| | . | . | . | . |
| | . | . | . | . |
| | n | Xn | Yn | Zgn |

| ABOVE-GROUND OPENING | COLOR VALUE | FLOATING-SINKING DEGREE $\Psi m$ | COLOR VALUE | GRADIENT Gm | COLOR VALUE | UNDER-GROUND OPENING $\Psi n$ | COLOR VALUE |
|---|---|---|---|---|---|---|---|
| $\theta 1$ | ××× | $\Psi m1$ | △△△ | Gm1 | ○○○ | $\Psi n$ | △○△ |
| | | $\Psi m2$ | | | | | |
| | | | | | | | |
| | | | | | | | |
| | | | | | | | |

FIG. 23B

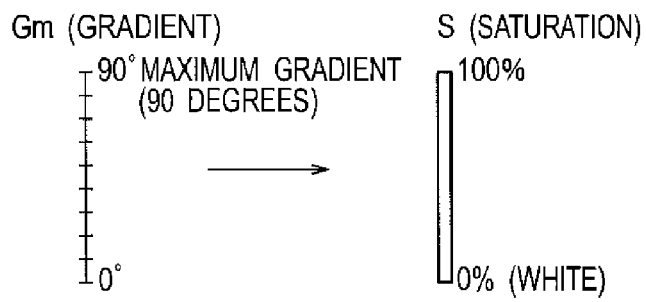

Gm (GRADIENT) → S (SATURATION)

90° MAXIMUM GRADIENT (90 DEGREES) → 100%

0° → 0% (WHITE)

FIG. 23C

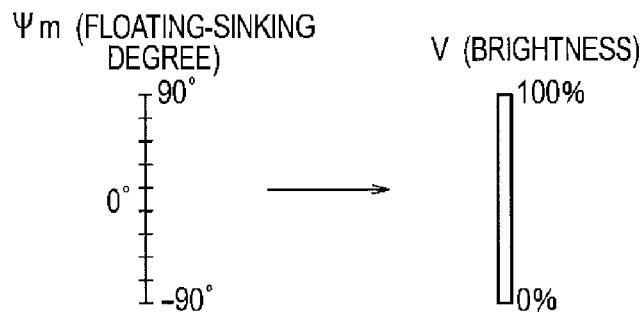

$\Psi m$ (FLOATING-SINKING DEGREE) → V (BRIGHTNESS)

SHADING IMAGE (EGi)

| mi | X COORDINATE (LONGITUDE: Xi) | Y COORDINATE (LATITUDE: Yi) | GRAY-SCALE VALUE Gri | | | | |
|---|---|---|---|---|---|---|---|
| e$_1$ 1 | X1 | Y1 | Gr1 | | | | |
| e$_2$ 2 | X2 | Y2 | Gr2 | | | | |
| . | . | . | Gr3 | | | | |
| . | . | . | | | | | |
| n | Xn | Yn | Grn | | | | |

FIG. 24B

ORTHO → HSV CONVERSION (SECOND HSV CONVERSION)

| mi | X COORDINATE (LONGITUDE: Xi) | Y COORDINATE (LATITUDE: Yi) | Sb | Hb (FIXED TO GREEN) | Vb | | |
|---|---|---|---|---|---|---|---|
| 1 | X1 | Y1 | Sb1 | Hb | Vb1 | | |
| 2 | X2 | Y2 | Sb2 | Hb | Vb2 | | |
| . | . | . | Sb3 | Hb | Vb3 | | |
| . | . | . | | | | | |
| n | Xn | Yn | Sbn | Hb | Vbn | | |

FIG. 24C

EHGi (SECOND SYNTHESIS UNIT)

| mi | X COORDINATE (LONGITUDE: Xi) | Y COORDINATE (LATITUDE: Yi) | COLOR VALUE (Gri+Vb+Sb) | | | |
|---|---|---|---|---|---|---|
| ehr$_1$ 1 | X1 | Y1 | (Gr1+Vb1+Sb1) | | | |
| ehr$_2$ 2 | X2 | Y2 | (Gr2+Vb2+Sb2) | | | |
| . | . | . | (Gr3+Vb3+Sb3) | | | |
| . | . | . | | | | |
| n | Xn | Yn | (Grn+Vbn+Sbn) | | | |

FIRST HSV CONVERTER

| GRID NUMBER i | X COORDINATE (LONGITUDE: Xi) | Y COORDINATE (LATITUDE: Yi) | H VALUE | S VALUE (Gm) | V VALUE ($\Phi$n) | | |
|---|---|---|---|---|---|---|---|
| 1 | X1 | Y1 | - | Sa1 | Va1 | | |
| 2 | X2 | Y2 | - | Sa2 | Va2 | | |
| . | . | . | - | Sa1 | Va2 | | |
| . | . | . | | | | | |
| n | Xn | Yn | - | | | | |

FIG. 25B

ORTHO → HSV CONVERSION (SECOND HSV CONVERSION)

| mi | X COORDINATE (LONGITUDE: Xi) | Y COORDINATE (LATITUDE: Yi) | Sb | Hb | Vb | | |
|---|---|---|---|---|---|---|---|
| 1 | X1 | Y1 | Sb1 | Hb | Vb1 | | |
| 2 | X2 | Y2 | Sb2 | Hb | Vb2 | | |
| . | . | . | Sb3 | Hb | Vb3 | | |
| . | . | . | | | | | |
| n | Xn | Yn | Sbn | Hb | Vbn | | |

FIG. 25C

RKGi (FIRST SYNTHESIS UNIT)

| mi | X COORDINATE (LONGITUDE: Xi) | Y COORDINATE (LATITUDE: Yi) | HSi(Sai+Vai+Hb) | | | | |
|---|---|---|---|---|---|---|---|
| 1 | X1 | Y1 | (Sa1+Va1+Hb) | | | | |
| 2 | X2 | Y2 | (Sa2+Va2+Hb) | | | | |
| . | . | . | (Sa3+Va3+Hb) | | | | |
| . | . | . | | | | | |
| n | Xn | Yn | | | | | |

EHGi (SECOND SYNTHESIS UNIT)

| GRID NUMBER i | X COORDINATE (LONGITUDE: Xi) | Y COORDINATE (LATITUDE: Yi) | EHGi | | | |
|---|---|---|---|---|---|---|
| 1 | X1 | Y1 | (Gr1+Vb1+Sb1) | | | |
| 2 | X2 | Y2 | (Gr2+Vb2+Sb2) | | | |
| . | . | . | (Gr3+Vb3+Sb3) | | | |
| . | . | . |  | | | |
| n | Xn | Yn | (Grn+Vbn+Sbn) | | | |

FIG. 26B

RKGi

| GRID NUMBER i | X COORDINATE (LONGITUDE: Xi) | Y COORDINATE (LATITUDE: Yi) | RKGi | | | |
|---|---|---|---|---|---|---|
| 1 | X1 | Y1 | HS1(Sa1+Va1+Hb) | | | |
| 2 | X2 | Y2 | HS2(Sa2+Va2+Hb) | | | |
| . | . | . | HS3(Sa3+Va3+Hb) | | | |
| . | . | . |  | | | |
| n | Xn | Yn |  | | | |

FIG. 26C

FKRGi        RKGi + HHGi

|  | GRID NUMBER i | X COORDINATE (LONGITUDE: Xi) | Y COORDINATE (LATITUDE: Yi) | Eoi+Hsi | | |
|---|---|---|---|---|---|---|
| kers1 | 1 | X1 | Y1 | Gr1+Vb1+Sb1+Sa1+Va1+Hb | | |
|  | 2 | X2 | Y2 | Gr2+Vb2+Sb2+Sa2+Va2+Hb | | |
| kers2 | . | . | . |  | | |
|  | . | . | . |  | | |
|  | n | Xn | Yn |  | | |

FIG. 28C
| Ori (ORi) | X COORDINATE (LONGITUDE: Xi) | Y COORDINATE (LATITUDE: Yi) | | | FKRGi |
|---|---|---|---|---|---|
| mi | | | | | |
| 1 | X1 | Y1 | | | Gr1+Vb1'+Sa1'+Va1'+Hb |
| 2 | X2 | Y2 | | | Gr2+Vb2'+Sb2'+Sa2'+Va2'+Hb |
| . | . | . | | | |
| . | . | . | | | |
| n | Xn | Yn | | | |
FIG. 28B
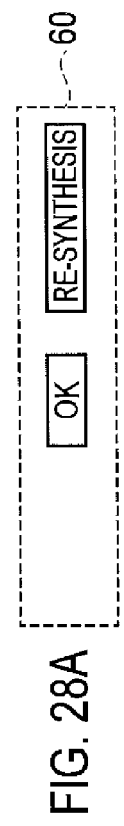
|  |  | Ha (DEGREE) | Sa% | Va% |
|---|---|---|---|---|
| RED COLOR | VALUE | 0 | 0~100% | 0~100% |
|  |  | 0% | 80% | 80% |
|  |  | Hb | Sb | Vb |
| ORTHO | VALUE | 0~360° | 0~100% | 10~100% |
|  |  | 100% | 20% | 20% |
FIX TO "0: RED"
COMBI-NATION RATIO
COMBI-NATION RATIO
FIG. 28A
61
[ OK ]   [ RE-SYNTHESIS ] — 60
FIG. 28D
THREE-DIMENSIONALIZED ORTHO IMAGE
RICE TERRACE AND MOUNTAIN SLOPE ARE WELL UNDERSTOOD ORTHO-PHOTO
OVERLAP WITH MAP BUT POOR THREE-DIMENSIONALITY
LAND FORM IS ALMOST NON-READABLE AND MAP IS NECESSARY THREE-DIMENSIONAL
EXPRESSION OF 1/25 K    FIG. 31
TOPOGRAPHICAL MAP
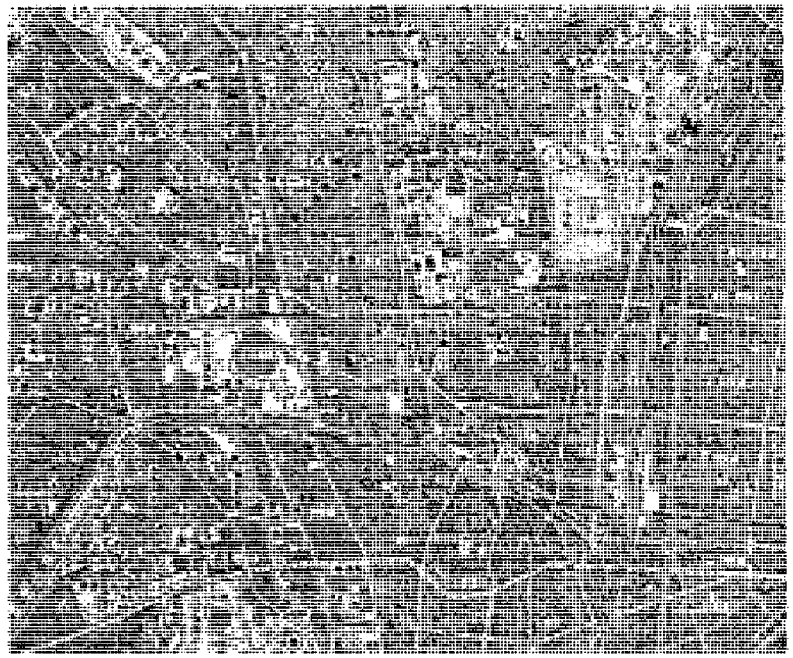
1/25 K TOPOLOGICAL MAP
RED    FIG. 32
BLUE
ORTHO THREE-DIMENSIONAL MAP EXPRESSION BY COMBINATION OF RED
THREE-DIMENSIONAL MAP AND ALTITUDE TINTS MAP WITH TOPOGRAPHICAL MAP FIG. 35 ABOVE-GROUND OPENING AND UNDERGROUND OPENING AT FOCUSED SAMPLING POINT (● SIGN) IN BASIC LAND FORM
OPENING IS SHOWN BY OCTAGONAL GRAPH HAVING RELATIVE SCALES IN AZIMUTH DIRECTIONS
IN WHICH ABOVE-GROUND ANGLE OR UNDERGROUND ANGLE OF FLAT GROUND (90 DEGREES) TAKES FIFTH SCALE

| | BASIC LAND FORM | ABOVE-GROUND OPENING | UNDERGROUND OPENING |
|---|---|---|---|
| 1 | FLAT GROUND | (MEDIUM) | (MEDIUM) |
| 2 | MOUNTAIN PEAK | (VERY LARGE) | (VERY SMALL) |
| 3 | CONCAVE GROUND | (VERY SMALL) | (VERY LARGE) |
| 4 | RIDGE IN NORTH-SOUTH DIRECTION | (LARGE) | (SMALL) |

:ELEVATION ANGLE θ OF SAMPLING POINT A
WITH RESPECT TO SAMPLING POINT B

:ABOVE-GROUND ANGLE AND UNDERGROUND ANGLE
OF D-L GROUP AT SAMPLING POINT A

Lab COLOR ADDED IMPROVED RED THREE-DIMENSIONAL MAP

RGB COLOR MULTIPLICATION SYNTHESIS

- $(Ra / 255) \times (Rb / 255) = Rc / 255$
- $(Ga / 255) \times (Gb / 255) = Gc / 255$
- $(Ba / 255) \times (Bb / 255) = Bc / 255$

- (BASIC COLOR × SYNTHESIS COLOR) / 255 = RESULT

RASTER IMAGE THREE-DIMENSIONALIZATION PROCESSING DEVICE, RASTER IMAGE THREE-DIMENSIONALIZATION METHOD, AND RASTER IMAGE THREE-DIMENSIONALIZATION PROGRAM

CROSS REFERENCE TO RELATED APPLICATIONS

This application is a Continuation of PCT Application No. PCT/JP2013/066469, filed on Jun. 14, 2013, and claims the priority of Japanese Patent Application No. 2012-134869, filed on Jun. 14, 2012 and the priority of Japanese Patent Application No. 2013-123850, filed on Jun. 12, 2013, the content of all of which is incorporated herein by reference.

TECHNICAL FIELD

The present invention relates to a raster image three-dimensionalization device which automatically three-dimensionalizes a raster image of a satellite image, an ortho-image, a topographic map, a geological map, a photograph, and the like.

BACKGROUND ART

For example, there has been developed a high-level remote sensing technique for obtaining data to be utilized for land form decipherment, land-cover classification, and the like which are performed in cartography and scientific research.

Among data obtained by the remote sensing, an ortho-photo image is a planar color photographic image (RGB: raster) in which a surface layer photograph captured by an airplane (RGB: raster) is geometrically transformed into an orthographical projection map, and trees, buildings, roads, ground surfaces, grass fields and the like can be easily deciphered in a visual manner. Furthermore, the ortho-photo image is an actual on-site image, and thus the ortho-photo image has a strong visual appeal and is utilized recently for various systems. For example, patent literature 1 discloses that tree tops are obtained through the use of DEM (Digital Elevation Model) and DSM (Digital Surface Model) and these tops are displayed on trees of the ortho-photo image.

Meanwhile, there is a geological map in which geological features are expressed in different colors (RGB: raster) on a contour map.

Moreover, there is an altitude tints map. The altitude tints map expresses land form by means of performing tinting corresponding to an elevation (RGB: raster).

In addition, there is a face photograph. This face photograph is also an RGB image (raster) in a sense.

Furthermore, there is a red relief image map which is disclosed in patent literature 2. This red relief image map is a pseudo color image in which a steeper slope is expressed in redder color by making a gradient amount proportional to red saturation, and also a ridge and an independent peak are expressed in higher brightness and a valley and a depressed area are expressed in lower brightness, by making a ridge-valley degree proportional to lightness.

CITATION LIST

Patent Literature

Patent Literature 1: Japanese Patent Laid-Open Publication No. 2008-111724

Patent Literature 2: Japanese Patent Publication No. 3670274

SUMMARY OF INVENTION

Technical Problem

However, shade is generated in the ortho-photo image by a contour or a planimetric feature depending on the altitude of the sun in photographing and a misalignment is generated in a joint part of plural photographs, and thus sometimes a portion which cannot be viewed is generated. Furthermore, there is generated a color difference caused by joint and sometimes visual quality is poor.

Moreover, a position shift and a portion which cannot be viewed are generated due to fall-down of a planimetric feature or the like, and, in particular, when trees grow thickly in a small valley of a mountain area, decipher becomes difficult because of a planer property of a color photograph.

Meanwhile, since trees have almost similar colors (e.g., green), it is difficult to judge a kind of a tree and the height of a tree even in a ridge part, and when an ortho-photo image is used, three-dimensionality is poor in a mountain area and also it is difficult to grasp a geographic state easily under the surface layer.

Furthermore, in the contour map, it is difficult for a human eye to obtain a feeling of unevenness without a lot of experience. Moreover, the topographic map is simply expressed by different colors and it is difficult to obtain three-dimensionality.

Moreover, in the altitude tints map, it is possible to grasp the land form in a comprehensive manner, but it is difficult easily to know micro-land form. Furthermore, a feeling of unevenness cannot be obtained much by the face photograph.

Moreover, the red relief image map (RGB: raster) provides a three-dimensionality by a red-based color and there arises a feeling of unnaturalness when the land form of a forest area or the like is expressed three-dimensionally.

That is, it is difficult to perform three-dimensional expression instantly without a feeling of unnaturalness only by using a raster image (including contour lines).

The present invention has been achieved for solving the above problems and aims at obtaining a raster image three-dimensionalization processing device which can provide a three-dimensional visual feeling without a feeling of unnaturalness for a raster image.

Solution to Problem

A raster image three-dimesionalization processing device of the present invention includes:
a first storage unit configured to store DEM data;
a second storage unit configured to store a raster image of a region where the DEM data is obtained;
a display unit;
(A) a unit configured to matching a mesh size of the DEM data with a mesh size of the raster image;
(B) a unit configured to obtain an above-ground opening image, an underground opening image, and a slope emphasis image in which a more enhanced color is allocated for a larger gradient value, from the DEM data, and obtain a three-dimensionally visualized image which combines these images;
(C) a unit configured to read a floating-sinking degree which is a parameter when the above-ground opening image and the underground opening image are obtained, and read a gradient when the slope emphasis map is obtained;

(D) a first HSV conversion unit configured to convert the floating-sinking degree and the gradient into brightness (Va) and saturation (Sa), respectively, while fixing hue (H) to "0", and output a conversion result as a first conversion image;

(E) a second HSV conversion unit configured to subject the raster image to HSV conversion and output a conversion result as a second conversion image;

(F) a unit configured to read the hue (H) of the second conversion image and obtain a first color composite image which combines this hue (H) and the first conversion image; and (G) a unit configured to generate a second color composite image which combines the first color composite image and the second conversion image, and display the second color composite image on a screen of the display unit.

Furthermore, a raster image three-dimensionalization method of the present invention includes preparing:

a first storage unit configured to store DEM data;

a second storage unit configured to store a raster image of a region where the DEM data is obtained;

a display unit, and causing a computer to perform:

(A) a step of matching a mesh size of the DEM data with a mesh size of the raster image;

(B) a step of obtaining an above-ground opening image, an underground opening image, and a slope emphasis image in which a more enhanced color is allocated for a larger gradient value, from the DEM data, and obtaining a three-dimensionally visualized image which combines these images;

(C) a step of reading a floating-sinking degree which is a parameter when the above-ground opening image and the underground opening image are obtained, and reading a gradient when the slope emphasis map is obtained;

(D) a first HSV conversion step of converting the floating-sinking degree and the gradient into brightness (Va) and saturation (Sa), respectively, while fixing hue (H) to "0", and outputting a conversion result as a first conversion image;

(E) a second HSV conversion step of subjecting the raster image to HSV conversion and outputting a conversion result as a second conversion image;

(F) a step of reading the hue (H) of the second conversion image and obtaining a first color composite image which combines this hue (H) and the first conversion image; and (G) a step of generating a second color composite image which combines the first color composite image and the second conversion image, and displaying the second color composite image on a screen of the display unit.

Moreover, a raster image three-dimensionalization program of the present invention includes preparing:

a first storage unit configured to store DEM data;

a second storage unit configured to store a raster image of a region where the DEM data is obtained; and a display unit, and causing a compute to execute function as:

(A) a unit configured to matching a mesh size of the DEM data with a mesh size of the raster image;

(B) a unit configured to obtain an above-ground opening image, an underground opening image, and a slope emphasis image in which a more enhanced color is allocated for a larger gradient value, from the DEM data, and obtain a three-dimensionally visualized image which combines these images;

(C) a unit configured to read a floating-sinking degree which is a parameter when the above-ground opening image and the underground opening image are obtained, and read a gradient when the slope emphasis map is obtained;

(D) a first HSV conversion unit configured to convert the floating-sinking degree and the gradient into value (Va) and saturation (Sa), respectively, while fixing hue (H) to "0", and output a conversion result as a first conversion image;

(E) a second HSV conversion unit configured to subject the raster image to HSV conversion and output a conversion result as a second conversion image;

(F) a unit configured to read the hue H of the second conversion image and obtain a first color composite image which combines this hue H and the first conversion image; and (G) a unit configured to generate a second color composite image which combines the first color composite image and the second conversion image, and display the second color composite image on a screen of the display unit.

BRIEF DESCRIPTION OF DRAWINGS

FIG. 4 is a flowchart explaining an outline of a raster image three-dimensionalization processing device of the present embodiment.

FIG. 6A is an explanatory diagram for mesh matching of an ortho-photo image and DEM, showing mesh size of the ortho-photo image.

FIG. 6B is an explanatory diagram for mesh matching of an ortho-photo image and DEM, showing mesh size of DEM.

FIG. 7 is an explanatory diagram of an underground opening image map.

FIG. 12 is an explanatory diagram of conversion data in a first HSV converter.

FIG. 18A explains data structure of an ortho-photo image OSGi.

FIG. 18B explains data structure of a shading image EGi.

FIG. 19 is an explanatory diagram of a data structure of a red three-dimensional image KGi.

FIG. 22A is an explanatory diagram, showing data structure in an ortho-photo image data.

FIG. 22B is an explanatory diagram of conversion data in a second HSV converter, showing conversion of color values into saturation.

FIG. 22C is an explanatory diagram of conversion data in a second HSV converter, showing conversion of color values into brightness.

FIG. 22D is an explanatory diagram of conversion data in a second HSV converter, showing conversion of color values into hue.

FIG. 23A is an explanatory diagram, showing data structure of red three-dimensional image data.

FIG. 23B is an explanatory diagram of conversion data in a first HSV converter, showing conversion of gradient into saturation.

FIG. 23C is an explanatory diagram of conversion data in a first HSV converter, showing conversion of floating-sinking degree into brightness.

FIG. 24A is an explanatory diagram of data synthesis in a second synthesis unit, showing data structure of shading image data.

FIG. 24B is an explanatory diagram of data synthesis in a second synthesis unit, showing data structure of raster conversion image data.

FIG. 24C is an explanatory diagram of data synthesis in a second synthesis unit, showing data structure of gray-colored raster conversion image data.

FIG. 25A is an explanatory diagram of data synthesis in a first synthesis unit, showing data structure of red gradient and floating-sinking degree conversion image data.

FIG. 25B is an explanatory diagram of data synthesis in a first synthesis unit, showing data structure of ortho-photo image data.

FIG. 25C is an explanatory diagram of data synthesis in a first synthesis unit, showing data structure of red-color and raster-hue composite image data.

FIG. 26A is an explanatory diagram of data synthesis in a third synthesis unit, showing data structure of gray-colored raster conversion image data.

FIG. 26B is an explanatory diagram of data synthesis in a third synthesis unit, showing data structure of red-color and raster-hue composite image data.

FIG. 26C is an explanatory diagram of data synthesis in a third synthesis unit, showing data structure of final red-color and raster-hue composite image data.

FIG. 28A is an explanatory diagram of an adjustment execution butten.

FIG. 28B is an explanatory diagram of an adjustment input box.

FIG. 28C is an explanatory diagram, showing data structure of temporary raster three-dimensional image.

FIG. 28D is an explanatory diagram, showing ortho-photo three-dimensional image obtained by the color adjustment processing.

FIG. 31 is an explanatory diagram of typical three-dimensional map expression.

FIG. 32 is an explanatory diagram of a map image obtained by processing of the present embodiment.

FIG. 35 is an explanatory diagram of main patterns of above-ground opening and underground opening.

DESCRIPTION OF EMBODIMENTS

Hereinafter, an embodiment most suitable for carrying out the present invention will be explained as an example. The present embodiment shown in the following illustrates a device and a method for realizing the technical idea of the present invention, and the technical idea of the present invention does not specify a structure and arrangement as those shown in the following.

The technical idea of the present invention can provide various modifications in the technical range described in claims. It is to be noted that the drawings are schematically provided and configurations and the like of a device and a system are different from real ones.

Figure 1:
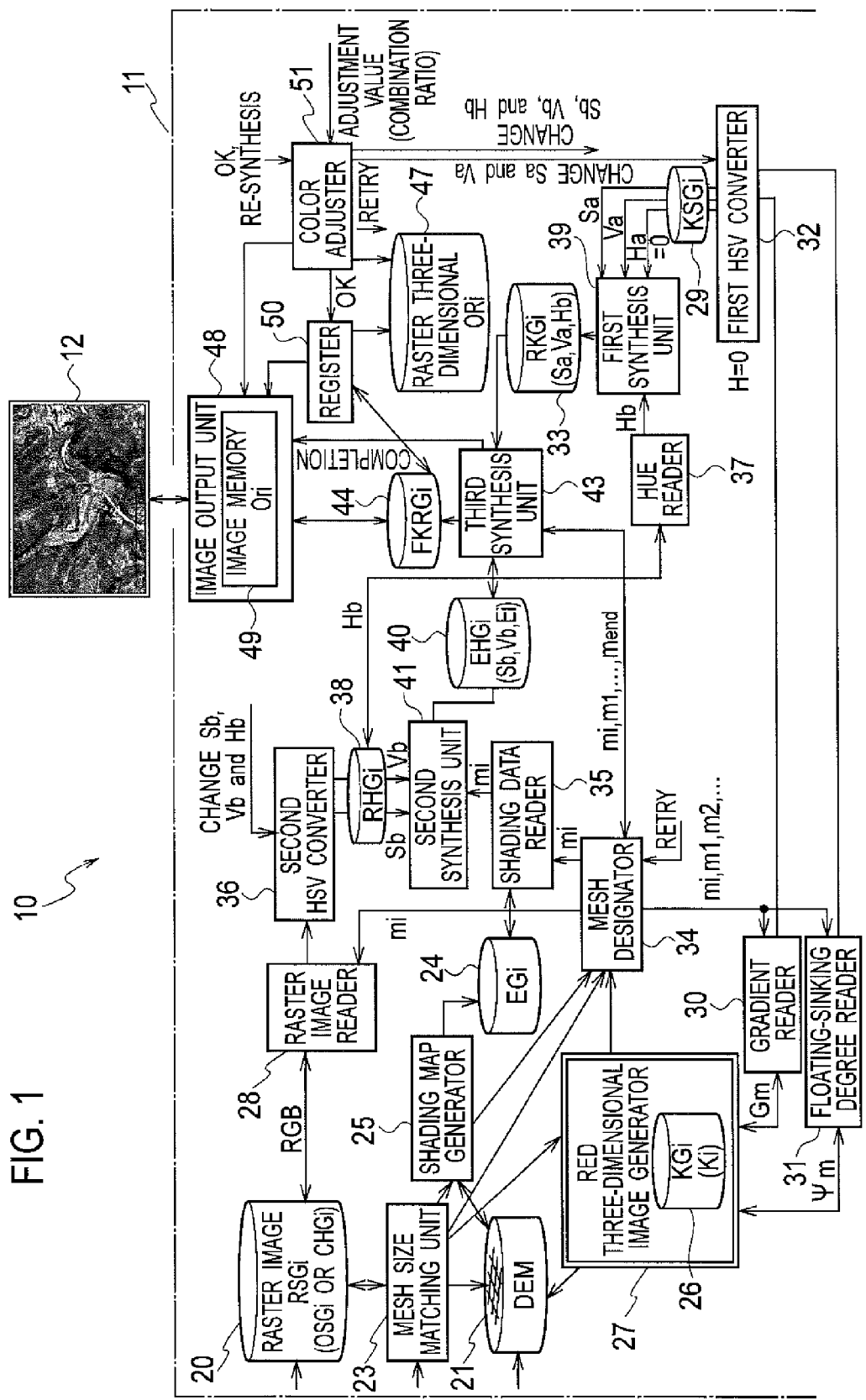
FIG. 1 is a schematic configuration diagram of a raster image three-dimensionalization processing device of the present embodiment.

FIG. 1 is a schematic configuration diagram of a raster image three-dimensionalization processing system 10. The raster image three-dimansionalization processing system has a CPU, a RAM, a ROM, a keyboard, a mouse and the like, and includes a program and a memory having the following configurations.

Meanwhile, while, as a raster image RSGi, there are a satellite image, a colored geological map, an aerial photograph, a painting, a video image, and the like, the raster image three-dimensionalization processing system 10 of the present embodiment will be explained as processing of three-dimensionally visualizing, as an example, an ortho-photo image OSGi (refer to FIG. 2) and a colored geological map image CHGi (refer to FIG. 3).

Figure 2:
FIG. 2 is an explanatory diagram for an ortho-photo image.

In the present embodiment, an example of the ortho-photo image OSGi is a photograph of a mountain village area in summer shown in FIG. 2 (a mountain forest, a river, a rice terrace, a house are captured, mostly in green color). In the ortho-photo image of FIG. 2, it is almost impossible to grasp land form (including elevation) and the image is difficult to view three-dimensionally.

Figure 3:
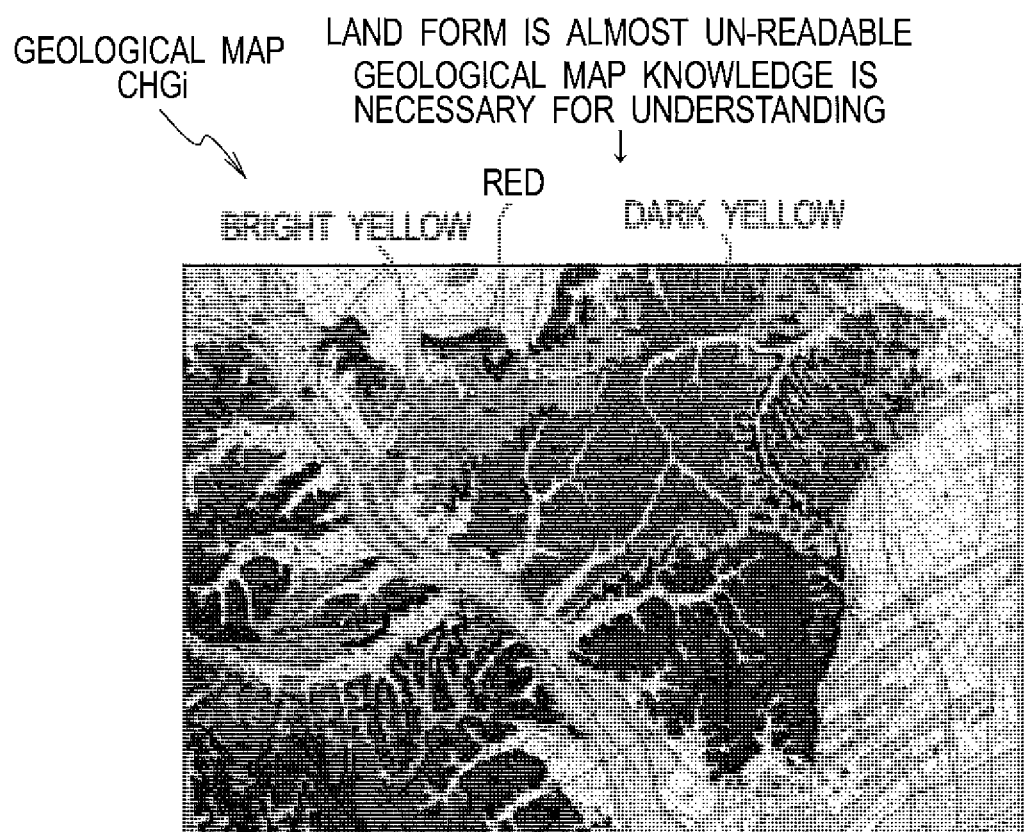
FIG. 3 is an explanatory diagram of a geological map.

Furthermore, an example of the geological map image CHGi is a map colored according to a geological map of "Matsushima" (Matsushima, Miyagi Prefecture, Japan) shown in FIG. 3. In the geological map image CHGi shown in FIG. 3, land form is expressed by contour lines and kinds of geological features are shown in colors such as green, yellow, bright red, light green, deep green, bright yellow, and brown.

In the geological map image CHGi of FIG. 3, it is hardly possible to grasp the land form (including contour lines). Geological knowledge is required for understanding.

Meanwhile, a lower-case character is added to image data of a mesh unit for explanation in the present embodiment.

As shown in FIG. 1, the raster image three-dimensionalization processing system 10 of the present embodiment includes a computer main body 11, a display unit 12, and the like.

As shown in FIG. 1, the computer main body 11 includes a memory 20 storing the raster image RSGi (ortho-photo image OSGi or a geological map CHGi) of a predetermined area, and a memory 21 storing DEM (Digital Elevation Model) of the predetermined area.

Furthermore, the computer main body 11 includes a mesh size matching unit 23, a shading map generator 25, a red three-dimensional image generator 27, a raster image reader 28, a gradient reader 30, a floating-sinking degree reader 31, a first HSV converter 32, a mesh designator 34, a shading data reader 35, a second HSV converter 36, a hue reader 37, a first synthesis unit 39, a second synthesis unit 41, a third synthesis unit 43, an image output unit 48, a register 50, a color adjuster 51 and the like, and causes the raster image RSGi having an elevation value to be viewed three-dimensionally.

The mesh size matching unit 23 reads a mesh (pixel) size of the raster image RSGi (ortho-photo image OSGi or geological map CHGi) in the memory 20 and a mesh size of DEM in the memory 21. Then, the mesh size matching unit 23 matches the mesh size of this DEM to the mesh size of the raster image RSGi (ortho-photo image OSGi or geological map CHGi), and outputs mesh a number mi (m1, m2, . . . ) thereof to the mesh designator 34.

Meanwhile, as to the mesh matching, the mesh of the raster image RSGi (ortho-photo image OSGi or geological map CHGi) may be divided for matching so as to have a mesh size of DEM.

The shading map generator 25 generates a shading image EGi by using DEM in the memory 21 after the mesh size matching, and stores the shading image EGi into a memory 24.

The red three-dimensional image generator 27 generates a red three-dimensional image KGi to be described below by using DEM in the memory 21 and stores the red three-dimensional image KGi into a memory 26. Processing of this red three-dimensional image generator 27 will be described below in detail.

Note that, in the present embodiment, mesh unit image data of the raster image RSGi is referred to as raster image data rsi.

Mesh unit image data of the ortho-photo image OSGi (or geological map CHGi) is referred to as ortho-photo image data osi (or geological map image data chi), mesh unit image data of the shading image EGi is referred to as shading image data ei, and mesh unit image data of the red three-dimensional image KGi is referred to as red three-dimensional image data ki and the like.

Every time the mesh number mi is designated by the mesh designator 34, the raster image reader 28 reads the raster image data rsi (ortho-photo image data osi or geological map image data chi) having this mesh number mi (m1, m2, m3, . . . ), and outputs the read data to the second HSV converter 36.

Every time the mesh number mi is designated by the mesh designator 34, the gradient reader 30 reads a gradient Gm of the red three-dimensional image data ki having this mesh number mi, and sequentially outputs the gradient Gm to the first HSV converter 32.

Every time the mesh number mi is designated by the mesh designator 34, the floating-sinking degree reader 31 reads a floating-sinking degree $\phi m$ (floating degree $\phi m+$ or sinking degree $\phi m-$) in the red three-dimensional image data ki having this mesh number mi, and sequentially outputs the floating-sinking degree $\phi m$ to the first HSV converter 32.

The first HSV converter 32 fixes H (hue: referred to as Ha for distinction) to "0" (unstable state). Every time the gradient (Gm) is input from the gradient reader 30, the first HSV converter 32 converts this gradient into saturation S (referred to as Sa for discrimination), and, every time the floating-sinking degree $\phi m$ is input from the floating-sinking degree reader 31, the first HSV converter 32 converts this floating-sinking degree $\phi m$ into value V (referred to as Va for discrimination), to thereby obtain (store) red gradient and floating-sinking degree conversion image data ksi (also referred to as first conversion image data) in a memory 29.

Meanwhile, a plurality of the red gradient and floating-sinking degree conversion image data sets ksi of the first mesh number mi to the last mesh number mi is collectively referred to as a red gradient and floating-sinking degree conversion image KSGi (also referred to as first conversion image).

The mesh designator 34 reads all the mesh numbers mi from the mesh size matching unit 23, and sequentially designates the mesh number mi from a smaller number.

The shading data reader 35 reads the shading data ei of the mesh number mi designated by the mesh designator 34 from the shading image EGi stored in the memory 24, and outputs this shading data ei to the second synthesis unit 41.

Every time the raster image data rsi (ortho-photo image data osi or geological map image data chi) of the raster image RSGi (ortho-photo image OSGi or geological map image CHGi) is input from the raster image reader 28, the second HSV converter 36 performs HSV conversion on RGB values of this image data and stores the conversion result into a memory 38 as raster conversion data rhi (also referred to as second conversion image data). Note that a plurality of raster conversion image data sets rhi of the first mesh number mi to the last mesh number mi is collectively referred to as a raster conversion image RHGi (also referred to as second conversion image).

The hue reader 37 reads hue Hb of the raster conversion image RHGi from the memory 38 for each mesh number mi when the raster image RSGi is subjected to the HSV conversion in the second HSV converter 36, and outputs this hue Hb to the first synthesis unit 39 as the red gradient and floating-sinking degree conversion image data ksi.

The first synthesis unit 39 reads the red gradient and floating-sinking degree conversion image data ksi in the memory 29, and reads the saturation Sa and the brightness Vb of the red gradient and floating-sinking degree composite image data ksi.

Then, the first synthesis unit 39 combines the hue Hb from the hue reader 37 in each of the raster conversion image data sets rhi and stores the combined data in a memory 33, and thereby obtains red-color and raster-hue composite image data rki (also referred to as first color composite image data).

This data is collectively referred to as a red-color and raster-hue composite image RKGi (also referred to as first composite image).

The second synthesis unit 41 obtains gray-colored raster conversion image data ehi in a memory 40 by combining the shading image data ei of each mesh from the shading data reader 35 and the raster conversion image data rhi of each mesh in the memory 38. Meanwhile, a plurality of the gray-colored raster conversion image data sets ehi of the first mesh number mi to the last mesh number mi is collectively referred to as gray-colored raster conversion image EHGi (also referred to as gray-colored conversion raster image).

The third synthesis unit 43 obtains red-color and raster composite image data fkri (also referred to as second color composite image data) by combining the gray-colored raster conversion image data ehi in the memory 40 and the red-color and raster-hue composite image data rki in the memory 33. Note that a plurality of the red-color and raster composite image data fkri of the first mesh number mi to the last mesh number mi is collectively referred to as red-color and raster composite image FKRGi (also referred to as second color composite image).

When the red-color and raster composite image FKRGi is generated in a memory 44, the image output unit 48 reads out this image into an image memory 49 as a temporary raster three-dimensional image Ori and displays the image on a screen.

The color adjuster 51 displays a color adjustment input box to be described below. Then, when a command "NG" indicating that three-dimensionality of the temporary raster three-dimensional image Ori on the screen is not satisfactory (NG) is input by an operator in mouse operation or the like, the color adjuster 51 reads adjustment values input in this color adjustment input box, between HSV (Ha, Sa, and Va) of the red three-dimensional image KGi and HSV (Hb, Sb, and Vb) of the raster image RSGi (ortho-photo image OSGi or geological map image CHGi).

Then, the new adjustment values are newly set in the first HSV converter 32 (red color side) and also the new adjustment values are set in the second HSV converter 36 (ortho-side).

Furthermore, when a command "OK" indicating that the three-dimensionality of the temporary raster three-dimensional image Ori displayed on the screen is satisfactory is input by the operator in the mouse operation or the like, the color adjuster 51 registers this temporary raster three-dimensional image Ori as an adjusted raster three-dimensional image ORi in a memory 47.

The above image output unit 48 preferably makes use of image editing software (Photoshop software).

FIG. 4 is a flowchart explaining an outline of raster image three-dimensionalization processing of the raster image three-dimensionalization processing system 10 of the present embodiment.

The mesh size matching unit 23 reads the mesh size of the raster image RSGi (ortho-photo image OSGi or geological map image CHGi) in the memory 20 and the mesh size of DEM in the memory 21, and matches the mesh size of DEM to the mesh size of the raster image RSGi (ortho-photo image OSGi or geological map image CHGi) (S1).

Figures 5A, 5B:
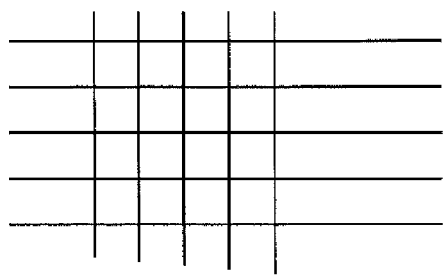
FIG. 5A is an explanatory diagram of DEM data.
FIG. 5B is an explanatory diagram of DEM data, constituted by associating coordinates of center point of each grid.

This DEM is referred to as digital elevation model data, and this model is shown in FIG. 5A. This DEM is a grid-like elevation data of the ground, obtained by setting a grid structure having desired grid spacing d (e.g., 0.2 m, 0.5 m, 1 m, or the like) in the whole measurement area, performing filtering of removing buildings, trees, and the like other than the ground surface from elevation data measured mainly by a pulse which last returns (last pulse) among reflected laser pulses in aerial laser survey data, and using an elevation value interpolation method.

Specifically, as shown FIG. 5B, DEM is constituted by associating an X coordinate (longitude Xi), a Y coordinate (latitude Yi), and a Z coordinate (ground elevation value Zgi) of the center point of each grid provided with a grid number i (i=1, 2, . . . , n) with one another.

An example of the above elevation value interpolation method is a method of generating a contour map connecting the same elevations in the aerial laser survey data, restoring the ground by generating an irregular triangle net (TIN) for this contour map, and obtaining the height of a cross point of the irregular triangle (TIN) and each of the grids.

In the present embodiment, DEM of, for example, a 1 m×1 m mesh is used for the ortho-photo image OSGi. When the geological map image CHGi is used, DEM uses, for example, a 500 m×500 m mesh.

When the above ortho-photo image OSGi is used, and when the mesh (grid) size (pixel) is 25 cm as shown in FIG. 6A and DEM is 1 m as shown in FIG. 6B, the 1 m mesh of DEM is divided in a 25 cm unit.

Meanwhile, when the mesh size of the ortho-photo image OSGi is matched to the mesh size of DEM, one mesh is formed by four pieces of the 25 cm mesh in each of the vertical and horizontal directions, in the ortho-photo image OSGi. That is, the mesh of the ortho-photo image OSGi is converted into a 1 m mesh.

Then, the mesh designator 34 sequentially designates the mesh number mi in response to the input of an image display instruction (S3).

Meanwhile, the red three-dimensional image generator 27 generates the red three-dimensional image KGi as follows. This red three-dimensional image KGi will be explained for the case of using "Matsushima" DEM having a 500 m×500 m mesh, as an example.

Figure 8:
FIG. 8 is an explanatory diagram of an above-ground opening image map.
Figure 9:
FIG. 9 is an explanatory diagram of a ridge-valley degree image map.

The red three-dimensional image generator 27 combines an underground opening image map (black and white image: higher elevation is expressed in whiter color) in the neighborhood of "Matsushima" shown in FIG. 7 and an above-ground opening image map (lower elevation is expressed in blacker color) shown in FIG. 8, for example, and obtains a ridge-valley degree image (also referred to as floating-sinking degree image) shown in FIG. 9.

Figure 10:
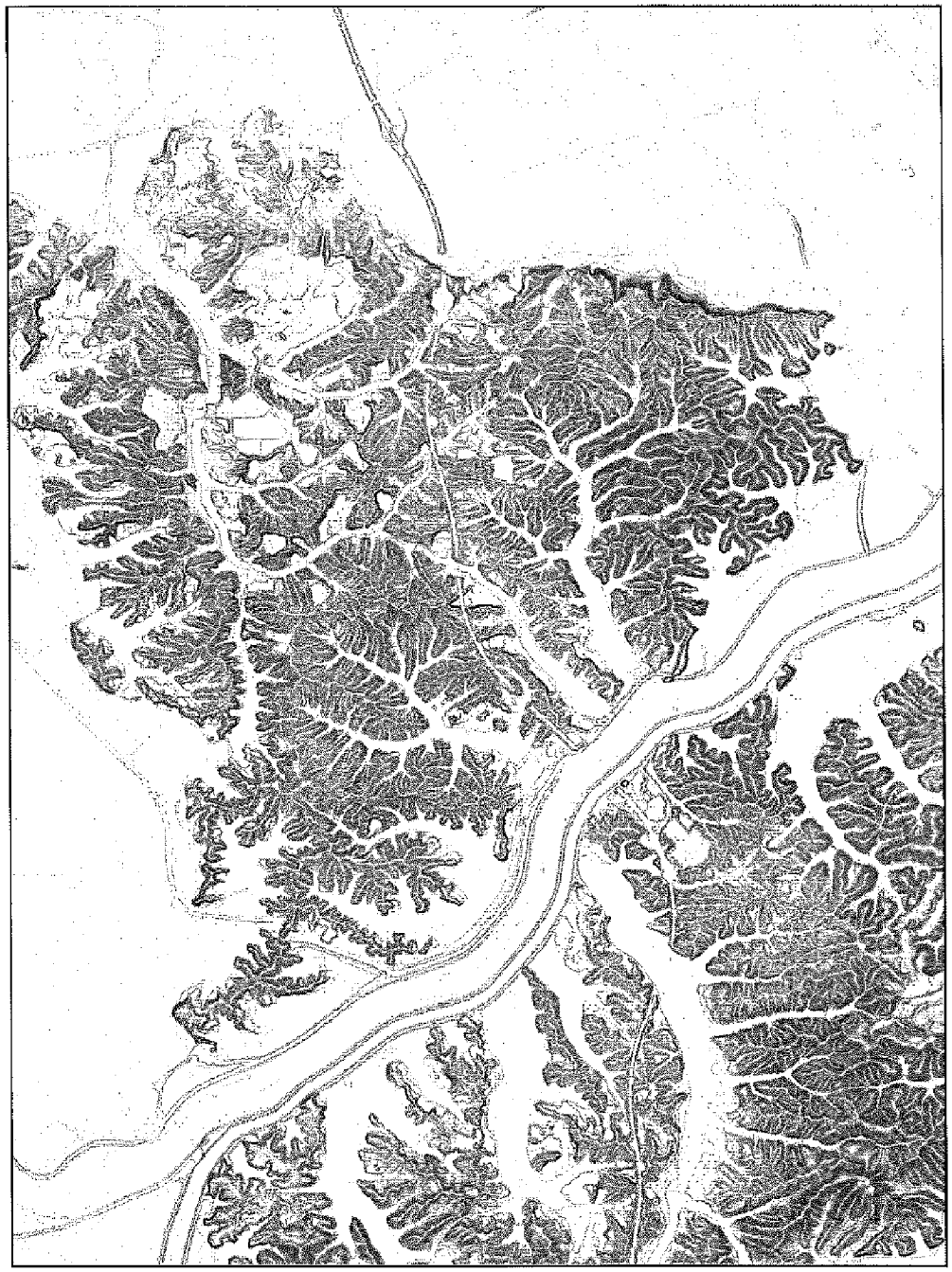
FIG. 10 is an explanatory diagram of a gradient image map.
Figure 11:
FIG. 11 is an explanatory diagram of a red relief image.

Then, the red three-dimensional image generator 27 combines the underground opening image map shown in FIG. 7 (black and white image), the above-ground opening image map shown in FIG. 8, the ridge-valley degree image map shown in FIG. 9, and a gradient image map shown in FIG. 10 in which red color is made deeper depending on the gradient, and obtains the red three-dimensional image KGI shown in FIG. 11. In the red three-dimensional image KGi, the RGB values are set so as to express a large gradient in deeper red color and a higher ridge in brighter color (white). Accordingly, the three-dimensionality is more enhanced (Japanese Patent Publication No. 3670274).

Every time the mesh number mi is designated, the gradient reader 30 reads the gradient Gm allocated to the mesh having the mesh number mi in the red three-dimensional image KGi (RGB image) of the red three-dimensional image generator 27, and outputs the gradient Gm to an S-channel of the first HSV converter 32 (S4).

Furthermore, every time the mesh number mi is designated, the floating-sinking degree reader 31 reads the floating-sinking degree φm allocated to the mesh having the mesh number mi in the red three-dimensional image KGi (RGB image) of the red three-dimensional image generator 27, and outputs the floating-sinking degree φm to a V-channel of the first HSV converter 32 (S5).

Every time the gradient Gm is input, the first HSV converter 32 converts this gradient (Gm) into the saturation Sa as shown in FIG. 12 (S10), and every time the floating-sinking degree φm is input, the first HSV converter 32 converts this floating-sinking degree φm into the brightness Va as shown in FIG. 12 (S11).

This first HSV converter 32 puts the hue into an unstable state (H=0). These values are stored as the red gradient and floating-sinking degree conversion image data ksi (collectively referred to as red gradient and floating-sinking degree conversion image KSGi).

Meanwhile, every time the mesh number mi is designated, the second HSV converter 36 subjects the raster image data rsi (ortho-photo image data osi or geological map image data chi) having this mesh number mi to the HSV conversion.

Then, the converted data is stored in the memory 38 as the raster conversion image data rhi (collectively referred to as raster conversion image RHGi) (S15).

Next, the hue reader 37 reads the hue (Hb: green) in the mesh unit raster conversion image data rhi of the raster conversion image RHGi in the memory 38, and outputs this hue to the first synthesis unit 39 (S17).

Next, the first synthesis unit 39 sequentially performs multiplication combination on the red gradient and floating-sinking degree conversion image data ksi having the mesh number mi in the red gradient and floating-sinking degree conversion image KSGi of the memory 29 and the hue Hb of the raster conversion image data rhi having the mesh number mi from the hue reader 37, and thus obtains the red-color and raster-hue composite image data rki (collectively referred to as red-color and raster-hue composite image RKGi) in the memory 33 (S20).

In contrast, every time the mesh number mi is designated, the shading data reader 35 reads the shading image data ei having this mesh number mi in the memory 24, and outputs this shading data ei to the second synthesis unit 41 (S21).

Every time the shading data ei is input from the shading data reader 35, the second synthesis unit 41 subjects the shading image data ei and the raster conversion image data rhi in the memory 38 corresponding to the mesh number of this shading image data ei to the multiplication combination, and thus obtains the gray-colored raster conversion image data ehi (collectively referred to as gray-colored raster conversion image EHGi) in the memory 40 (S22).

Next, the third synthesis unit 43 subjects the gray-colored raster conversion image data ehi in the memory 40 and the red-color and raster-hue composite image data rki in the memory 33 to the multiplication combination, and stores the conversion result in the memory 44 as the red-color and raster composite image data fkri (collectively referred to as red-color and raster composite image FKRGi).

Next, the third synthesis unit 43 determines whether or not the mesh number designated by the mesh designator 34 is the last mesh number of the meshes defined in the memory 44, and causes the next mesh number to be designated when the mesh number is not the last mesh number mi (S26).

In step S26, when having determined that the mesh number is the last mesh number, the third synthesis unit 43 outputs a command causing the image output unit 48 to display the red-color and raster composite image FKRGi in the memory 44. The image output unit 48 displays, on the screen, the red-color and raster composite image FKRGi in the memory 44 as the temporary raster three-dimensional image Ori (S27).

In such a state, the operator determines whether or not the three-dimensionality of the temporary raster three-dimensional image Ori displayed in step S27 is satisfactory. When the three-dimensionality is satisfactory, the operator inputs the command "OK" by using a keyboard or a mouse, and, when the three-dimensionality is not satisfactory, the operator inputs a color adjustment instruction.

That is, the color adjuster 51 determines whether or not there exists the command input indicating three-dimensionality OK or three-dimensionality NG (S30).

When the command of three-dimensionality NG is input, the color adjuster 51 executes the color adjustment processing and newly sets color tones of the first HSV converter 32 and the second HSV converter 36 (S32).

Furthermore, the color adjuster 51 notifies the register 50 of the fact that the command of three-dimensionality OK is input, and the register 50 registers, in the memory 47, the temporary three-dimensional image Ori in the image memory 49 of the image output unit 48, as the adjusted raster three-dimensional image ORi (S34). Note that the adjusted raster three-dimensional image ORi in this memory 47 may be output to the outside by an output unit which is not shown in the drawing. For example, the adjusted raster three-dimensional image ORi may be printed by a printer or may be output to an external device.

Here, an example of the adjusted raster three-dimensional image ORi obtained by the color adjustment will be explained. For example, when the saturation or the like is not satisfactory in the temporary raster three-dimensional image Ori, the operator displays the raster conversion image RHGi in the memory 38 and the gray-colored raster conversion image EHGi in the memory 40, and performs setting so as to perform, for example, 100% conversion of only the saturation Sb of the raster conversion image RHGi into the saturation Sa of the red-color and raster-hue composite image RKGi. This setting value is set in the second HSV converter 36 by the color adjuster 51.

Figure 13:
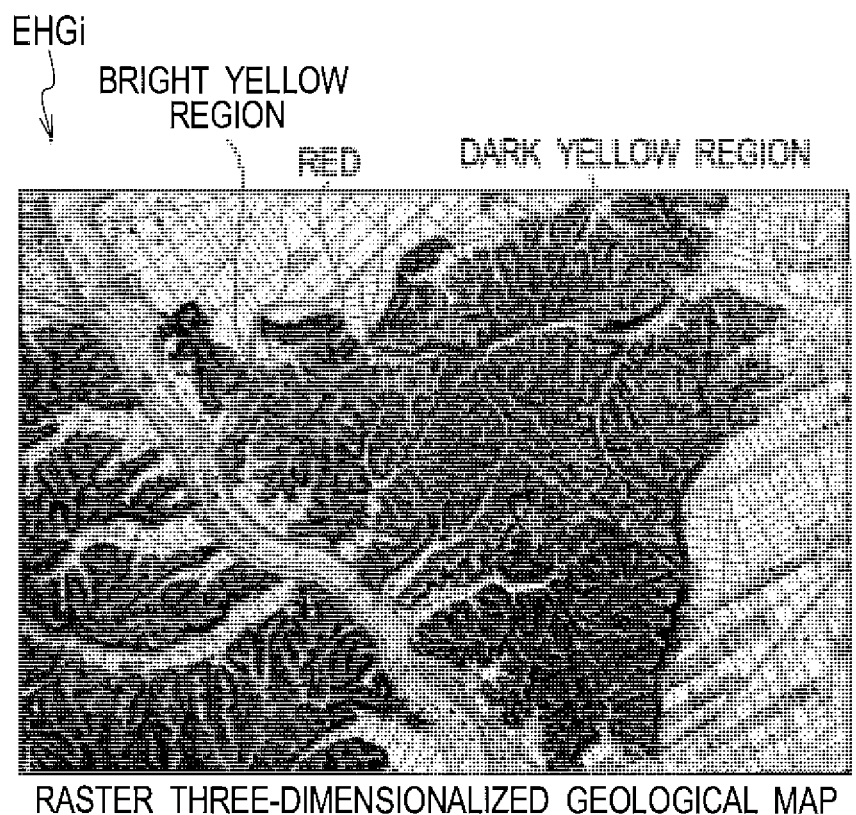
FIG. 13 is an explanatory diagram of a raster conversion image RHGi.

For example, when the geological map image CHGi of "Matsushima" shown in FIG. 3 is stored in the memory 20, the image subjected to the HSV conversion by the second HSV converter 36 is combined with the shading image EGi by the second synthesis unit 41, and becomes the gray-colored raster conversion image EHGi in which only the saturation Sa is converted into the saturation Sb as shown in FIG. 13.

The gray-colored raster conversion image EHGi in which only this saturation Sa is converted has a bright color as a whole, as compared with FIG. 3. That is, color having a higher saturation provides a higher three-dimensionality. Therefore, a relationship between the land form and the geological features can be understood in an intuitive manner, as compared with FIG. 3.

Furthermore, the operator does not change the saturation Sa and the brightness Va of the red gradient and floating-sinking degree conversion image KSGi, and sets the hue Ha thereof so that, for example, 100% conversion into the hue Hb of the red-color and raster-hue composite image RKGi is performed.

Figure 14:
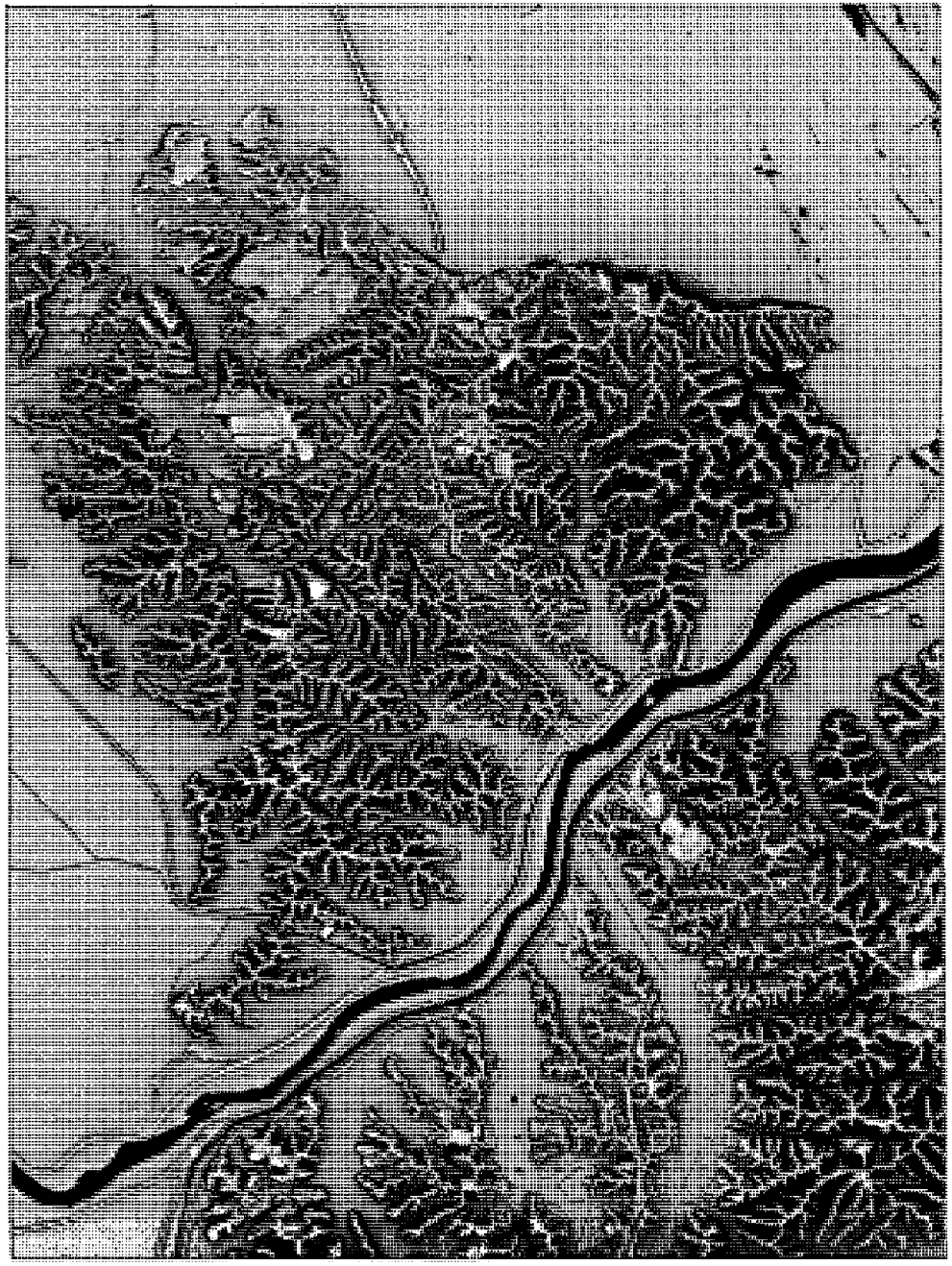
FIG. 14 is an explanatory diagram of a red-color and raster-hue composite image RKGi.

This setting value is set in the first HSV converter 32 by the color adjuster 51, and serves as the red-color and raster-hue composite image RKGi in which only the hue Ha is converted into the hue Hb on the raster side as shown in FIG. 14.

The red-color and raster-hue composite image RKGi of FIG. 14 has enhanced brightness, and the ridge becomes lighter and the valley becomes darker (because of emphasized floating-sinking degree and gradient).

Figure 15:
FIG. 15 is an explanatory diagram of a red-color and raster composite image FKRGi.

Then, the third synthesis unit 43 subjects this red-color and raster-hue composite image RKGi of FIG. 14 and the gray-colored raster conversion image EHGi of FIG. 13 to the multiplication combination, and obtains the red-color and raster composite image FKRGi shown in FIG. 15.

As shown in FIG. 15, color shade and brightness become clear and higher three-dimensionality is obtained. This red-color and raster composite image FKRGi shown in FIG. 15 is displayed as the temporary raster three-dimensional image Ori.

Figure 16:
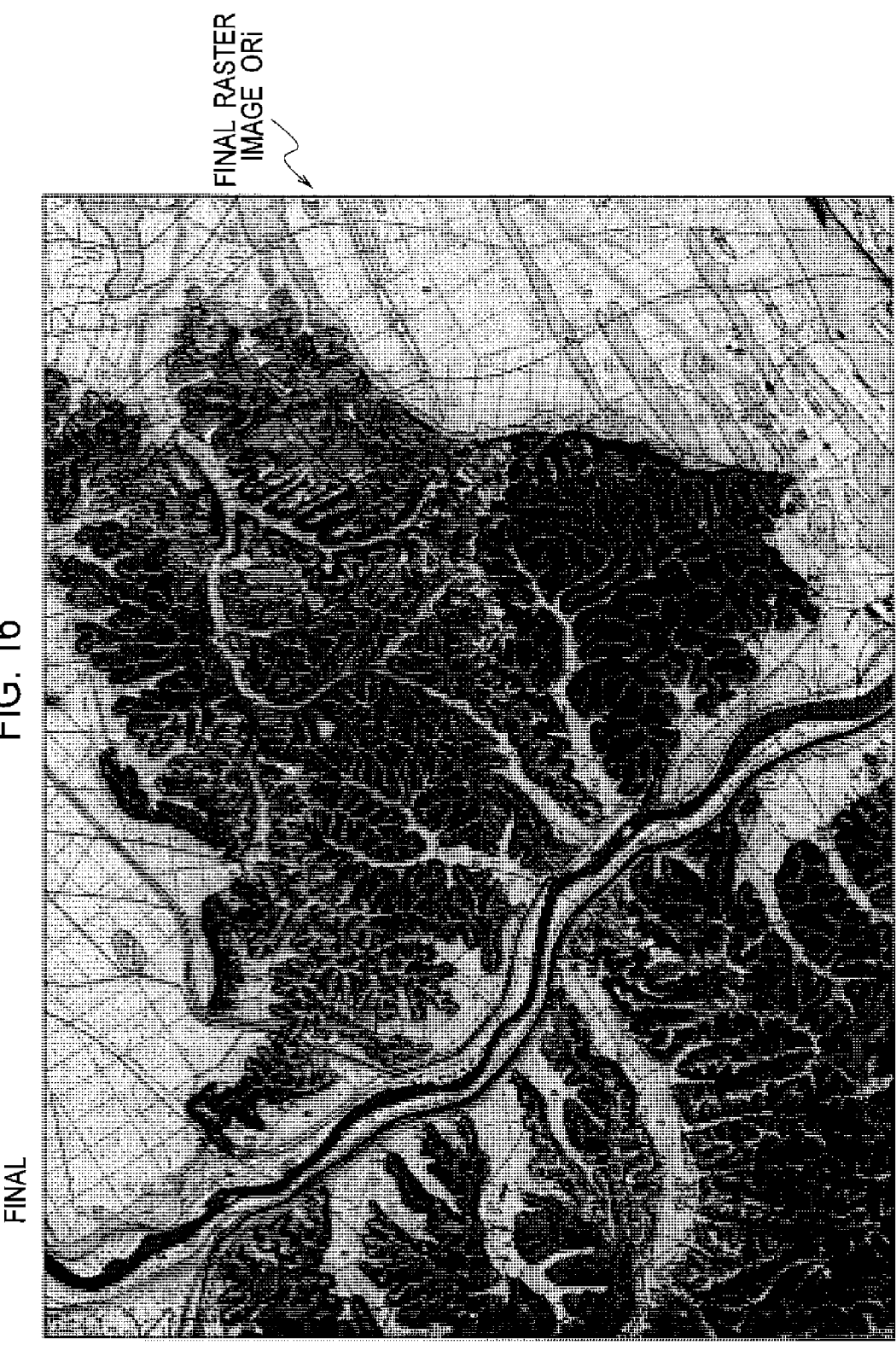
FIG. 16 is an explanatory diagram of an adjusted raster three-dimensional image ORi.

Then, the operator adjusts this temporary raster three-dimensional image Ori so as to allow a character, for example, to be seen and to obtain higher three-dimensionality, and finally obtains the adjusted raster three-dimensional image ORi as shown in FIG. 16.

(Detailed Explanation of the Raster Image Three-Dimensionalization Processing)

Figure 17:
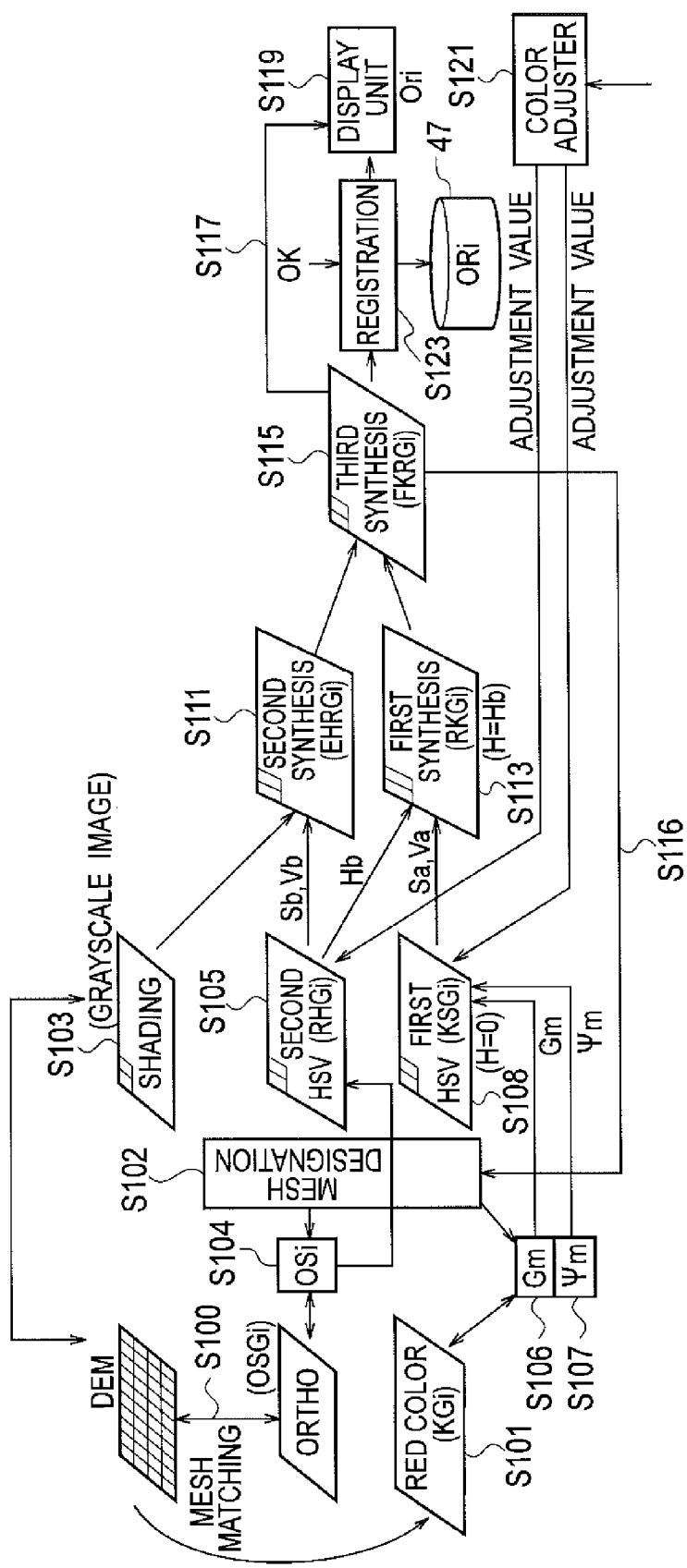
FIG. 17 is a detailed explanatory diagram of the raster image three-dimensionalization processing in FIG. 4.

The above raster image three-dimensionalization processing of FIG. 4 will be further explained through the use of a processing flowchart of FIG. 17. In FIG. 17, an explanation will be made using the raster image RSGi as the ortho-photo image OSGi shown in FIG. 2.

Before the explanation of FIG. 17, data structures of the ortho-photo image OSGi and the shading image EGi will be explained through the use of FIGS. 18A and 18B. In addition, a data structure of the red three-dimensional image KGi will be explained through the use of FIG. 19.

As shown in FIG. 18A, the above ortho-photo image OSGi is constituted of an ortho-photo image data osi group in which the mesh number mi is associated with the X and Y coordinates of the mesh, color values (RGB values) of the mesh, and the like.

As shown in FIG. 18B, the shading image EGi is constituted of a shading image data ei group in which the mesh number mi is associated with the X and Y coordinates of the mesh, a gray scale value of the mesh, and the like.

As shown in FIG. 19, the red three-dimensional image KGi is constituted of a red three-dimensional image data ki group in which the mesh number mi is associated with the X coordinate, the Y coordinate, the Z coordinate, a search range, a grid spacing, the above-ground opening $\theta i$, color values (RGB), the underground opening, color values (RGB) thereof, the floating-sinking degree, color values (RGB) thereof, the gradient, color values (RGB) thereof, and the like of the mesh.

Figure 20:
FIG. 20 is an explanatory diagram of a difference in raster image three-dimensionalization processing of the present embodiment.

In the raster image three-dimensionalization processing of the present embodiment, as shown in FIG. 17, the mesh size matching unit 23 matches the mesh size of DEM to the mesh size of the ortho-photo image OSGi (S100). An example of this ortho-photo image OSGi is shown in FIG. 20. A rice terrace is captured in FIG. 20. The ortho-photo image OSGi of FIG. 20 overlaps with the map but has a poor three-dimensionality.

Furthermore, the red three-dimensional image generator 27 generates the red three-dimensional image KGi from DEM in the memory 21 after the matching of the mesh sizes has been finished, and stores the red three-dimensional image KGi in the memory 26 (S101). The generation of this red three-dimensional image KGi will be explained below in detail.

In addition, the mesh designator 34 sequentially designates the mesh number mi (m1, m2, . . . ) (S102).

Meanwhile, the shading map generator 25 generates the shading image EGi (gray color) by using DEM in the memory 21 after the matching of the mesh sizes has been finished, and stores the shading image EGi into the memory 24 (S103).

Moreover, every time the mesh number mi is designated, the raster image reader 28 reads the ortho-photo image data osi having this mesh number mi from the memory 20, and sequentially outputs this ortho-photo image data osi to the second HSV converter 36 (S104).

Every time the ortho-photo image data osi is input, the second HSV converter 36 subjects this data to the HSV conversion (S105). This HSV conversion makes use of a HSV conversion color model shown in FIG. 21.

Namely, the second HSV converter 36 converts each of the color values (RGB) in the ortho-photo image data osi (osi, osi, . . . ) of the ortho-photo image OSGi shown in FIG. 22A, into the saturation Sb as shown in FIG. 22B, into the brightness Vb as shown in FIG. 22C, and also into the hue Hb as shown in FIG. 22D.

Furthermore, every time the mesh number mi is designated, the gradient reader 30 reads the gradient Gm allocated to the mesh having the mesh number mi in the red three-dimensional image KGi of memory 26, and outputs the gradient Gm to the first HSV converter 32 (S106).

Moreover, every time the mesh number mi is designated, the floating-sinking degree reader 31 reads the floating-sinking degree $\phi m$ allocated to the mesh having the mesh number mi in the red three-dimensional image KGi of the memory 26, and outputs the floating-sinking degree $\phi m$ to the first HSV converter 32 (S107).

Figure 21:
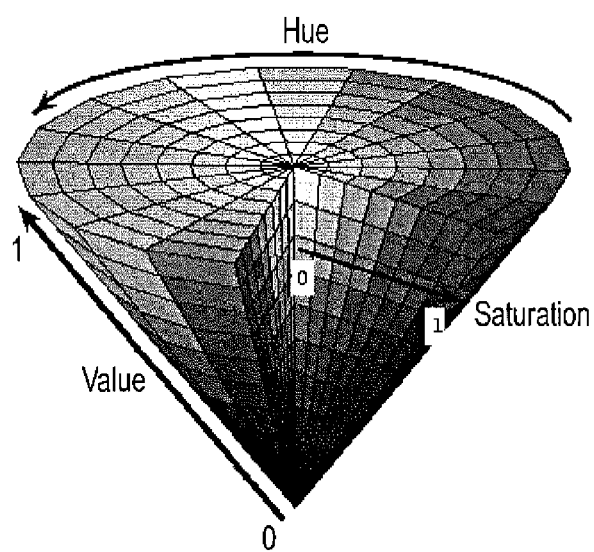
FIG. 21 is an explanatory diagram of a HSV conversion color model.

In addition, the first HSV converter 32 converts the gradient Gm into the saturation Sa every time the gradient Gm is input, and converts the floating-sinking degree $\phi m$ into the brightness Va every time the floating-sinking degree $\phi m$ is input, through the use of the HSV conversion color model shown in FIG. 21 (S108). However, the first HSV converter 32 puts the hue Ha into a unstable state (H=0).

Namely, the first HSV converter 32 converts the gradient Gm into the saturation Sa as shown in FIG. 23B and converts the floating-sinking degree $\phi m$ into the brightness Va as shown in FIG. 23C, in the red three-dimensional image data ki (k1, k2, . . . ) of the red three-dimensional image KGi shown in FIG. 23A.

Meanwhile, the second synthesis unit 41 inputs the saturation Sb and the brightness Vb for each of the raster conversion image data sets rhi from the second HSV converter 36 and the shading image data ei from the shading data reader 35, and sequentially outputs the gray-colored raster conversion image data ehi which combines these data sets to the third synthesis unit 43 (S111).

That is, the second synthesis unit 41 obtains the gray-colored raster conversion image data ehi which combines a gray scale value Gri (Gr1, or Gr2 . . . ) in the shading image data ei (e1, e2, . . . ) of the shading image EGi shown in FIG. 24A, and the saturation Sbi (Sb1, Sb2, . . . ) and the brightness Vbi (vb1, vb2, . . . ) in the raster conversion image data rhi obtained by the HSV conversion of the ortho-photo image OSGi in FIG. 24B (refer to FIG. 24C).

In FIG. 24C, the color value part of the gray-colored raster conversion image data ehi is indicated as EOi.

Furthermore, every time the saturation Sa ($\phi m$) and the brightness Va (Gm) of the red gradient and floating-sinking degree conversion image data ksi from the first HSV converter 32 and the hue Hb of the ortho-photo image data osi from the hue reader 37 are input, the first synthesis unit 39 subjects these data sets to the multiplication combination, and outputs synthesis data to the third synthesis unit 43 as the red-color and raster-hue composite image data rki (collectively referred to as red-color and raster-hue composite image RKGi) (S113).

That is, as shown in FIGS. 25A, 25B, and 25C, the first synthesis unit 39 obtains the red-color and raster-hue composite image RKGi in which the saturation Sa (φm) and the brightness Va (Gm) shown in FIG. 25A from the first HSV converter 32 and the hue Hb of the ortho-photo image data osi shown in FIG. 25B and obtained in the second HSV converter 36 are subjected to the multiplication combination as shown in FIG. 25C, and outputs the red-color and raster-hue composite image RKGi to the third synthesis unit 43.

In FIG. 25C, the color value (sai+vai+Hb) part of the red-color and raster-hue composite image RKGi is indicated as HSi.

Then, every time the gray-colored raster conversion image data ehi from the second synthesis unit 41 and the red-color and raster-hue composite image data rki from the first synthesis unit 39 are input, the third synthesis unit 43 writes the red-color and raster composite image data fkri (collectively referred to as red-color and raster composite image FKRGi) subjected to the multiplication combination of these data sets, sequentially into the memory 44 (S115).

Namely, every time the gray-colored raster conversion image data ehi (grayscale value Gri+saturation Sbi+brightness Vbi) shown in FIG. 26A from the second synthesis unit 41 and the red-color and raster-hue composite image data rki (saturation Sai+value Vai+hue Hb) shown in FIG. 26B from the first synthesis unit 39 are input, the third synthesis unit 43 generates the red-color and raster-hue composite image data rki (Gri+Vbi+Sbi+Sai+Vai+Hbi) subjected to the mesh unit multiplication combination of these data sets, as shown in FIG. 26C.

Furthermore, every time the red-color and raster-hue composite image data rki (Gri+Vbi+Sbi+Sai+Vai+Hbi) is written into the mesh of the memory 44, the third synthesis unit 43 outputs write-in completion to the mesh designator 34 and causes the next mesh number to be designated (S116).

Furthermore, when the red-color and raster-hue composite image data rki is written into the last mesh of the memory 44, the third synthesis unit 43 notifies the image output unit 48 of the generation of the red-color and raster composite image FKRGi (S117).

Then, when the red-color and raster composite image FKRGi is generated in the memory 44, the image output unit 48 displays this data on the screen as the temporary raster three-dimensional image Ori. (S119).

Then, when the "NG" is input in the color adjustment input box, that is, the three-dimensionality of the temporary raster three-dimensional image Ori is not satisfactory, the color adjuster 51 reads adjustment values (Ha', Sa', and Va') for HSV (Ha, Sa, and Va) of the red three-dimensional image KGi and adjustment values (Hb', Sb', and Vb') for HSV (Hb, Sb, and Vb) of the raster image RSGi which are input into this color adjustment input box. Then, the color adjuster 51 sets the adjustment values (Ha', Sa', and Va') newly in the first HSV converter 32 (red color side) and also sets the new adjustment values (Hb', Sb', and Vb') in the second HSV converter 36 (ortho-side) (S121).

Furthermore, when "OK" is input, that is, the three-dimensionality of the temporary raster three-dimensional image Ori is satisfactory, the color adjuster 51 registers this temporary raster three-dimensional image Ori in the memory 47, as the adjusted raster three-dimensional image ORi (S123).

(Supplementary Explanation of the Color Adjuster 51)

The above color adjustment processing of the color adjuster 51 will be explained in a supplementary manner.

Figure 27:
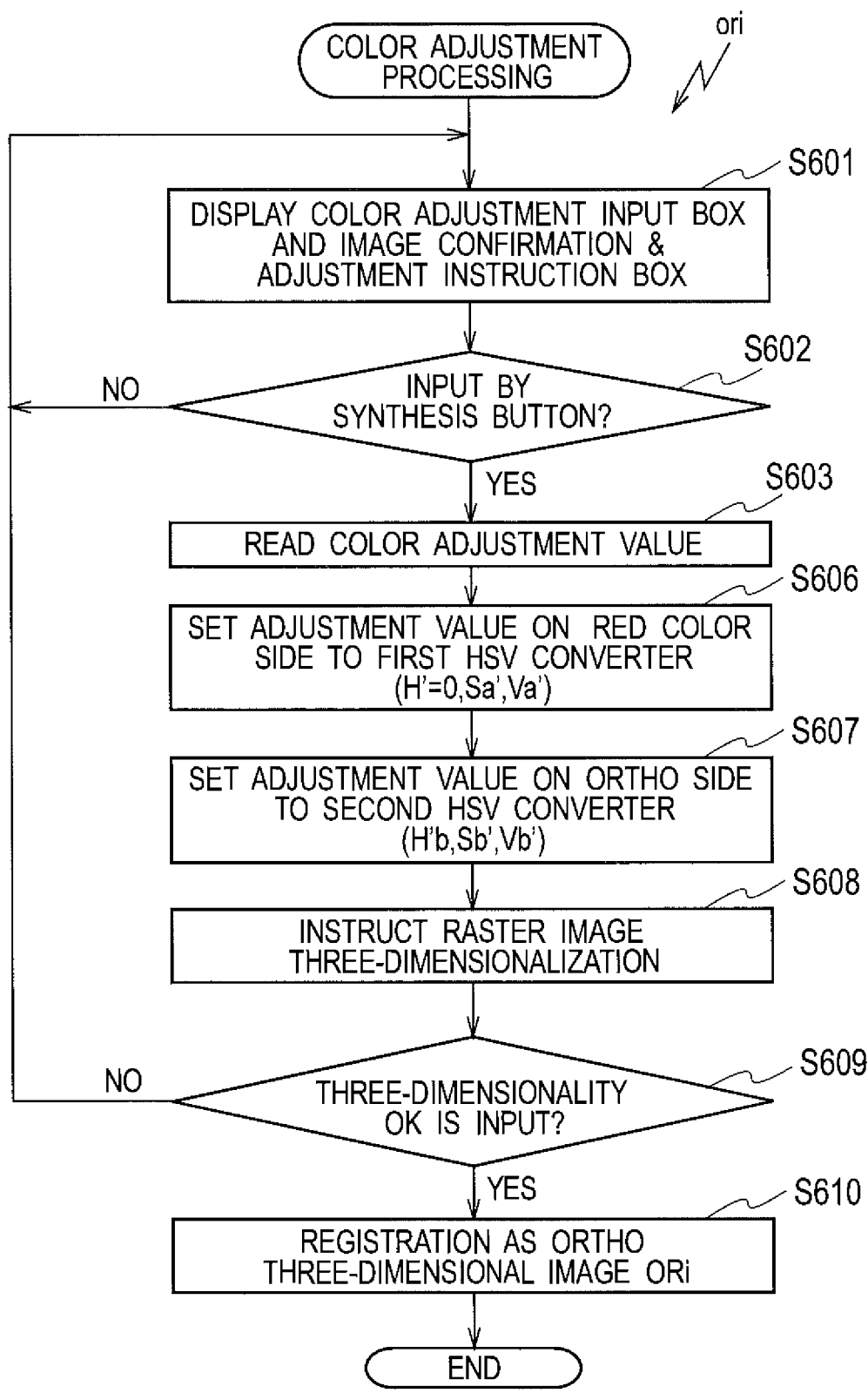
FIG. 27 is a flowchart explaining color adjustment processing.

FIG. 27 is a flowchart explaining the color adjustment processing. FIG. 28A shows the color adjustment execution butten 60. Furthermore, FIG. 28B shows the color adjustment input box 61.

FIG. 28C shows the temporary raster three-dimensional image Ori of the memory 44. Furthermore, FIG. 28D shows the adjusted raster three-dimensional image ORi (ortho) obtained by the color adjustment processing.

When the red-color and raster composite image FKRGi of the memory 44 is displayed as the temporary raster three-dimensional image Ori, the color adjuster 51 displays the color adjustment execution butten 60 and the color adjustment input box 61 shown in FIGS. 28A and 28B next to the temporary raster three-dimensional image Ori (S601).

Then, the operator determines whether or not the three-dimensionality of the temporary raster three-dimensional image Ori is satisfactory, and, when the three-dimensionality is not satisfactory, the operator inputs the color adjustment values into the color adjustment input box 61.

These color adjustment values are ratios for combining Ha, Sa, and Va on the red three-dimensional image side and Hb, Sb, and Vb of the ortho-photo image, and input by the keyboard or the mouse.

For example, as shown in FIG. 28B, the color adjustment values of 80% for the red-color side HSV values and 20% for the ortho-side HSV values are input by the keyboard or the mouse.

In this state, the color adjuster 51 determines whether or not a re-synthesis button is selected (S602).

In step S602, when the re-synthesis button is not selected, the processing goes to step S601 and the input of the color adjustment values enters a waiting state.

Next, when the re-synthesis button is selected, the color adjustment values input in the color adjustment input box 61 (e.g., 80% for the red-color side and 20% for the ortho-side) are read (S603).

Then, the adjustment values for the red-color side are set in the first HSV converter 32, and also the adjustment values for the ortho-side are set in the second HSV converter 36 (S606 and S607).

Then, a raster image three-dimesionalization instruction is output (S608).

Next, the input state of the "OK" button is determined (S609).

In step S609, when input in the "OK" button exists, the register 50 registers the temporary raster three-dimensional image Ori of the screen (image memory), in the memory 47 as the adjusted raster three-dimensional image ORi (S610).

The processing of the flowchart of FIG. 4 or FIG. 17 is performed in response to the above raster image three-dimensionalization instruction.

That is, when the color adjuster 51 outputs the raster image three-dimensionalization instruction to the mesh designator 34, the mesh designator 34 sequentially designates the mesh number mi (m1, m2, . . . ).

Meanwhile, the shading map generator 25 generates the shading image EGi (gray color) using DEM of the memory 21 after the matching of the mesh sizes has been finished, and stores this shading image EGi into the memory 24.

In addition, every time the mesh number mi is designated, the raster image reader 28 reads the ortho-photo image data osi having this mesh number mi from the memory 20, and outputs this ortho-photo image data osi to the second HSV converter 36.

Every time the ortho-photo image data osi is input, the second HSV converter 36 performs the conversion into the saturation Sb' and the brightness Vb' having the reset adjustment values (20% for Sb and 20% for Vb) (note that Hb is fixed).

Furthermore, every time the mesh number mi is designated, the gradient reader 30 reads the gradient (Gm) allocated to the mesh having the mesh number mi in the red three-dimensional image KGi in the memory 26, and outputs the gradient to the first HSV converter 32.

Moreover, every time the mesh number mi is designated, the floating-sinking degree reader 31 reads the floating-sinking degree φm allocated to the mesh having the mesh number mi in the red three-dimensional image KGi of the memory 26, and outputs the floating-sinking degree φm to the first HSV converter 32.

In addition, the first HSV converter 32 converts the gradient (Gm) into the saturation Sa' using the reset adjustment values (20% for Sa and 20% for Va) and, every time the floating-sinking degree φm is input, the first HSV converter 32 converts this floating-sinking degree φm into the brightness Va'. However, this first HSV converter 32 puts Ha' into an unstable state (H=0).

Meanwhile, the second synthesis unit 41 inputs the saturation Sb' and the brightness Vb' from the second HSV converter 36 and the shading image data ei from the shading data reader 35, and, every time these data sets are input, the second synthesis unit 41 outputs the gray-colored raster conversion image data ehi' which combines these date sets, to the third synthesis unit 43.

Furthermore, every time the red gradient and floating-sinking degree conversion data ksi' based on the saturation Sa'(φm) and the brightness Va' (Gm) from the first HSV converter 32 and the hue Hb of the ortho-photo image data osi from the hue reader 37 are input, the first synthesis unit 39 combines these data sets, and outputs the composite image data to the third synthesis unit 43 as the red-color and raster-hue composite image data rki'.

Then, every time the gray-colored raster conversion image data ehi' from the second synthesis unit 41 and the red-color and raster-hue composite image data rki' from the first synthesis unit 39 are input, the third synthesis unit 43 generates the red-color and raster composite image data fkri' which combines these data sets (collectively referred to as red-color and raster composite image FKRGi').

That is, as shown in FIG. 28C, the saturation and the brightness of the red-color and raster composite image FKRGi' are changed by the adjustment values input in the adjustment input box 60.

Then, every time a gray-colored red-color and ortho-hue composite image (KEOSGi') is generated in the memory 44, the image output unit 48 displays this image on the screen as the temporary raster three-dimensional image Ori.

FIG. 28D shows the ortho-photo three-dimensional image synthesized through the use of the new color adjustment values like this. The ortho-photo three-dimensional image of FIG. 28D provides a map in which a rice terrace and a mountain slope are grasped easily.

Figure 29:
FIG. 29 is an explanatory diagram of an ortho-photo image.
Figure 30:
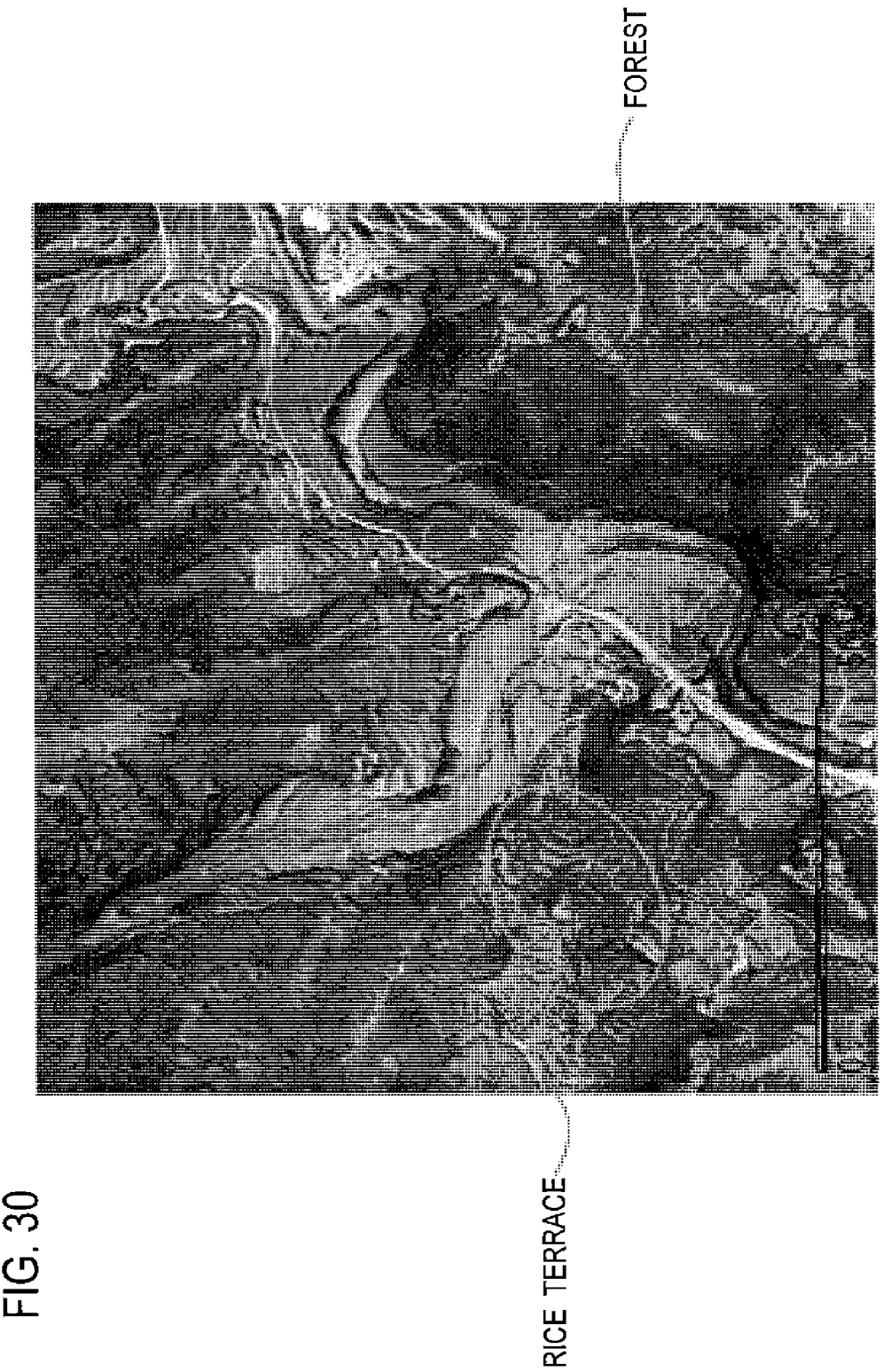
FIG. 30 is an explanatory diagram when an ortho-photo image is three-dimensionalized according to the present embodiment.

When a typical ortho-photo image shown in FIG. 29 and the ortho three-dimensional image shown in FIG. 30 are compared, the three-dimensionality is poor and the land form almost cannot be grasped in the typical ortho-photo image shown in FIG. 29. Therefore, a map is necessary for grasping the land form. Meanwhile, by performing the above processing, it is possible to obtain the ortho-photo image (ortho three-dimensional image) having a satisfactory three-dimensionality as shown in FIG. 30, and FIG. 30 shows a map in which the rice terrace and the mountain slope are easily grasped.

Note that, while the ortho-photo image is explained as an example of the raster image in the above embodiment, the raster image may be a satellite image or a geological map. Here, the satellite image is subjected to orthographic projection conversion and is stored in the memory 20.

Moreover, FIG. 32 shows a case of three-dimesionalizing a topographic map in an urban area shown in FIG. 31. FIG. 32 three-dimensionalizes this map by combining a red three-dimensional image and an altitude tints map to the topographic map of FIG. 31.

As shown in FIG. 31, topographic unevenness is not grasped in a typical topographic map. However, when the topographic map is three-dimensionalized by the present processing, as shown in FIG. 32, the map expresses a steeper slope in redder, lower altitude in bluer, and higher altitude in a changed color of green, yellow, or red (altitude tint step expression). Here, a shade by north-west light is added slightly.

(Detailed Explanation of the Red Three-Dimensional Image Generator)

Next, the generation of the red three-dimensional image KGi will be explained in detail.

Figure 33:
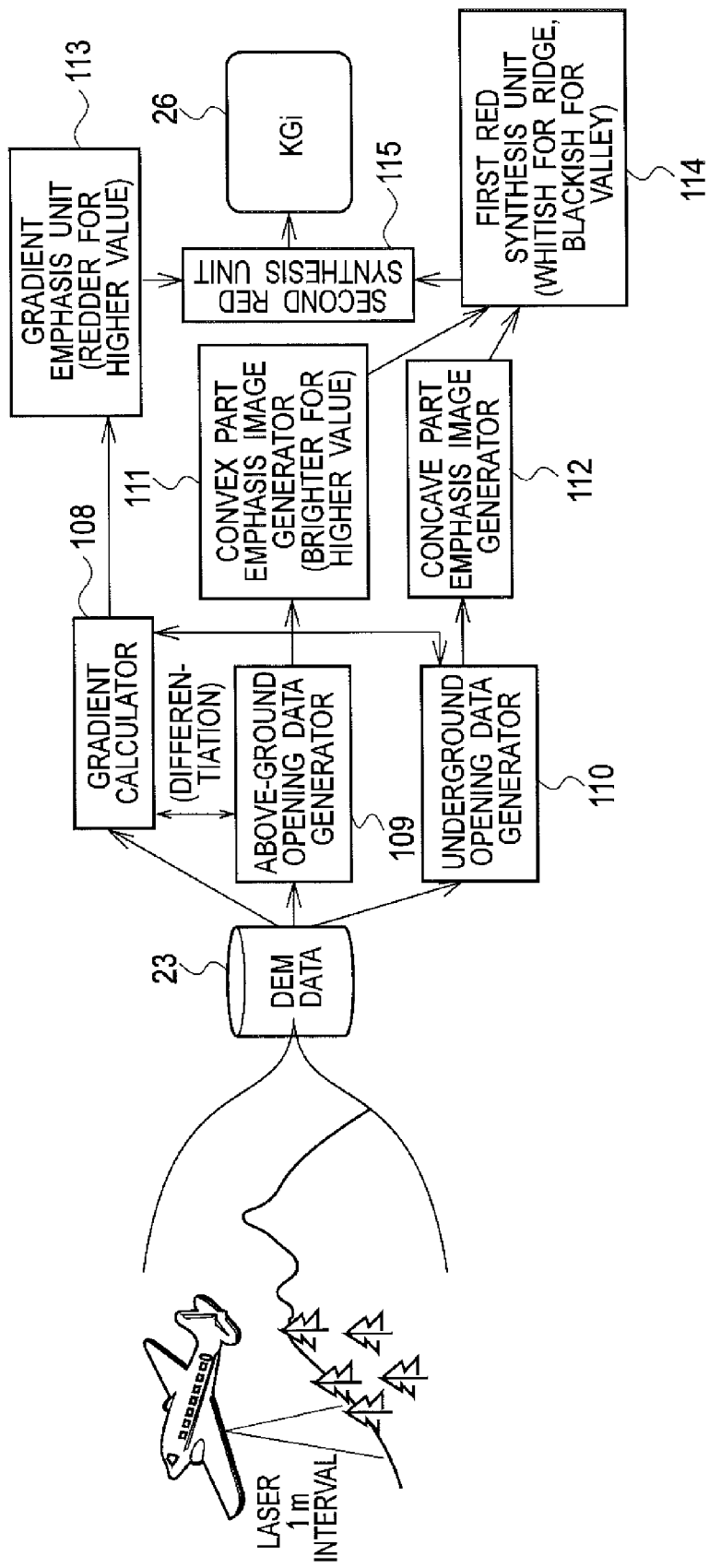
FIG. 33 is a schematic configuration diagram of a red three-dimensional image generator.

FIG. 33 is a schematic configuration diagram of the red three-dimensional image generator 27. As shown in FIG. 33, the red three-dimensional image generator 27 includes a computer function which will be explained below.

As shown in FIG. 33, the red three-dimensional image generator 27 includes an above-ground opening data generator 109, an underground opening data generator 110, a gradient calculator 108, a convex part emphasis image generator 111, a concave part emphasis image generator 112, a gradient emphasis unit 113, a first red synthesis unit 114, and a second red synthesis unit 115.

Figure 34:
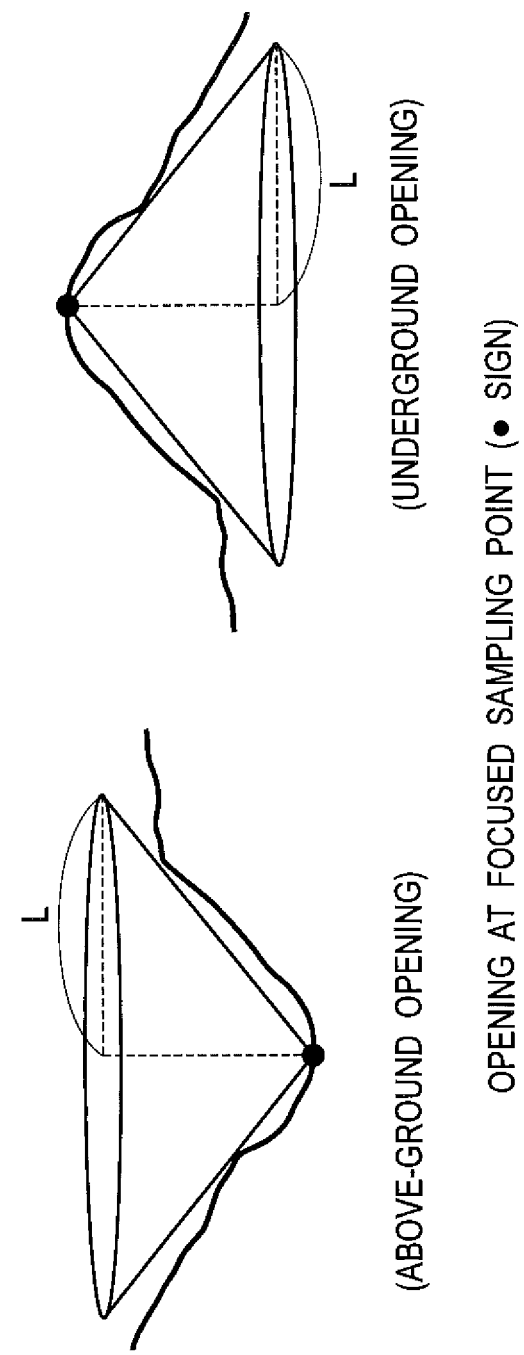
FIG. 34 is an explanatory diagram of principles of above-ground opening and underground opening.

The present embodiment uses a concept of opening. This opening will be explained. The opening quantifies a degree of protruding above the ground and a degree of biting into the underground at a certain site as compared with the surrounding area. Namely, as shown in FIG. 34, the above-ground opening expresses a wide area of the sky which can be viewed in the range of the distance L from a focused sampling point, and the underground opening expresses a wide underground space in the range of the distance L when the earth is viewed in headstand.

The opening depends on the distance L and a surrounding land form. FIG. 35 shows the above-ground opening and the underground opening of the four kinds of basic land form by octagonal graphs of an above-ground angle and an underground angle for each azimuth. Generally, the above-ground opening becomes higher at a site protruding high from the surrounding area, and takes high values at a peak and a ridge of a mountain and takes low values at a depressed area and a valley floor. FIG. 35 shows the above-ground opening and the underground opening at a focused sampling point in the basic land form (point shown by a black circle), and shows respective relative scales for each azimuth, as the octagonal graphs, where each of the above-ground angle and the underground angle for a flat ground (90 degrees) takes the fifth scale.

In an opposite manner, the underground opening becomes higher at a site which bites deeper into the underground and takes high values at a depressed area and a valley floor, and takes low values at a peak and a ridge of a mountain. Actually, since various kinds of basic land forms are mixed in the range of the distance L, there are many cases where each of the octagonal graphs for the above-ground angle and the underground angle is deformed and the opening takes various values.

Since $D\phi L$ and $D\psi L$ have non-increasing characteristics with respect to L as described above, $\Phi L$ and $\Psi L$ also have non-increasing characteristics with respect to L. Furthermore, depending on designation of a calculation distance, an opening map can extract information suitable for land form dimensions, and can be displayed without depending on directionality or local noise.

Figures 36A, 36B, 36C:
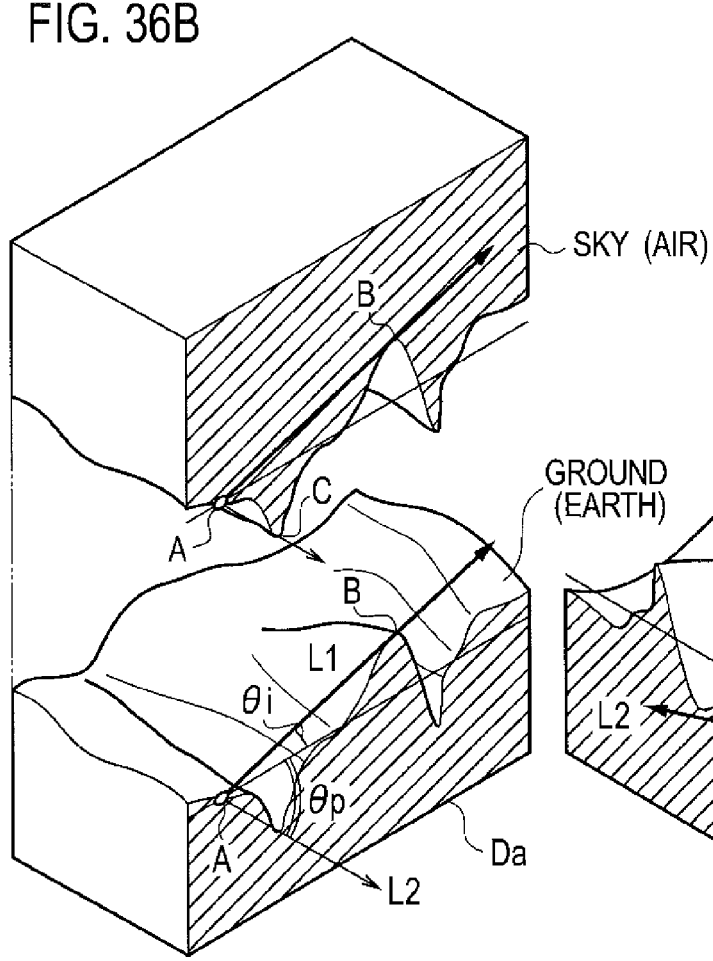
FIG. 36A is a three-dimensional explanatory diagram of above-ground opening and underground opening, showing ground surface described by DEM data.
FIG. 36B is a three-dimensional explanatory diagram of above-ground opening and underground opening, showing a mating three-dimensional body corresponding to ground surface described by DEM data.
FIG. 36C is a three-dimensional explanatory diagram of above-ground opening and underground opening, showing reversed DEM data.

Namely, the opening map is excellent in extracting a ridge line and a valley line to thereby allow abundant information on land form-geological features to be deciphered. As shown in FIGS. 36A, 36B, and 36C, on the DEM data in a certain range (ground surface: three dimensional: FIG. 36A), an angular vector is obtained between a straight line L1 connected to a sampling point B serving as the highest peak and the horizontal line when any one of the eight directions is viewed from a set sampling point A.

This angular vector is obtained for each of the eight directions, and an average value thereof is referred to as the above-ground opening $\theta i$ (floating degree), and an angle $\theta p$ is obtained between the horizontal line and a straight line L2 connected to a sampling point C of the highest peak (corresponding to the deepest point) when any one of the eight directions is viewed from a sampling point A in reversed DEM data (FIG. 36C) in which an air layer is pressed onto the DEM data (ground surface: three dimensional) in a certain range to form a mating three-dimensional body (FIG. 36B) and this mating three-dimensional body is reversed (FIG. 36C).

This angle is obtained in each of the eight directions and an average value thereof is referred to as the underground opening (sinking degree).

Namely, the above-ground data generator 119 generates a geographic cross-section for each of the eight directions on the DEM data included in a range from a focused point to a certain distance, and obtains a maximum value of the gradients (from a vertical direction) of lines connecting respective points and the focused point (L1 in FIG. 36A).

This processing is performed on each of the eight directions. The gradient angle is an angle from the vertex (90 degrees for a flat ground, 90 degrees or more for a ridge and a mountain peak, and 90 degrees or less for a valley floor and a depressed area).

Furthermore, the underground opening data generator 110 generates a geographical cross section for each of the eight directions in a range from the focused point to a certain distance in the reversed DEM data, and obtains a maximum value of the gradients of lines connecting respective points and the focused point (minimum value when L2 is viewed from the vertical direction in the ground surface three-dimensional map of FIG. 36A). Such processing is performed on each of the eight directions.

An angle when L2 is viewed from the vertical direction in the ground surface three-dimensional map of FIG. 36A is 90 degrees for a flat ground, 90 degrees or less for a ridge and a peak of a mountain, and 90 degrees or more for a valley floor and a depressed area.

Figure 37A:
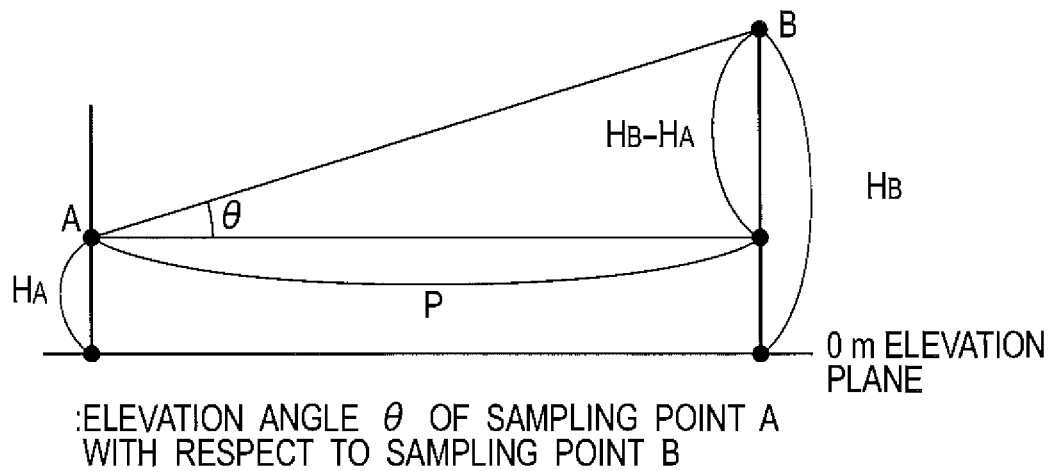
FIG. 37A is an explanatory diagram of a sampling point and distance for above-ground opening and underground opening, showing elevation angle of the sampling point.
Figure 37B:
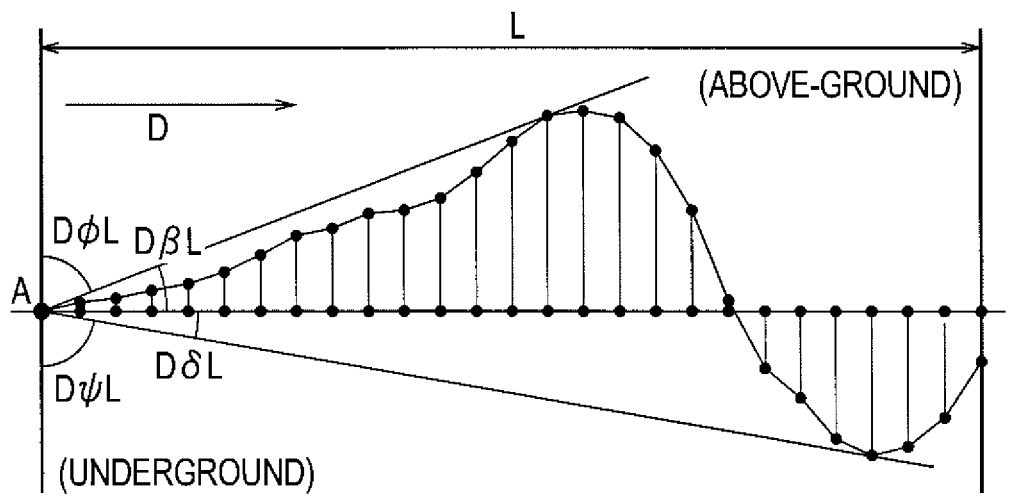
FIG. 37B is an explanatory diagram, showing maximum value and minumum value among elevation angles.

Namely, as shown in FIGS. 37A and 37B, as to the above-ground opening and the underground opening, two sampling points of A ($i_A$, $j_A$, $H_A$) and B ($i_B$, $j_B$, $H_B$) are considered. As the sampling interval is 1 m, the distance between the sampling point A and the sampling point B becomes $$P=\{(i_A-i_B)^2+(j_A-j_B)^2\}^{1/2} \quad (1).$$

That is, the distance P is calculated as a distance between the two sampling points A and B, in the horizontal direction.

FIG. 37A shows a relationship between the sampling points A and B with respect to a reference of 0 m elevation. The elevation angle $\theta$ of the sampling point A with respect to the sampling point B is given by $$\theta=\tan^{-1}\{(H_B-H_A)/P\}.$$

The sign of $\theta$ becomes positive (1) when $H_A<H_B$ (when sampling point B is higher than sampling point A), and becomes negative (2) when $HA>H_B$ (when sampling point B is lower than sampling point A). $\theta$ is calculated in the degree measure and takes a value from −90 degrees to 90 degrees.

A group of the sampling points which exists in an azimuth direction D and in a range of the distance L from the focused sampling point is described as DSL and this group is referred to as "D-L group of a focused sampling point". Here, it is defined that $D\beta L$: maximum value among the elevation angles of the focused sampling points with respect to DSL points, and $D\delta L$: minimum value among the elevation angles of the focused sampling point with respect to of DSL points (refer to FIG. 37B).

$D\beta L$ and $D\delta L$ are defined in the degree measure. Here, the following definition is performed.

Definition I: The above-ground angle $D\phi L$ and the underground angle $D\psi L$ of the D-L group for the focused sampling point means $$D\phi L=90 \text{ degrees}-D\beta L, \text{ and}$$

$$D\psi L=90 \text{ degrees}+D\delta L, \text{ respectively}.$$

$D\phi L$ and $D\psi L$ are defined in the degree measure.

$D\phi L$ means a maximum value of the vortex angles in which the sky in the azimuth direction D can be viewed within the distance L from the focused sampling point. The generally used horizontal line angle corresponds to the above-ground angle when L is increased infinitely. Furthermore, $D\psi L$ means a maximum value of nadir angles in which the earth in the azimuth direction D can be viewed within the distance L from the focused sampling point.

When L is increased, the number of sampling points belonging to DSL increased, and thus $D\beta L$ has non-decreasing characteristics and conversely $D\delta L$ has non-increasing characteristics.

Accordingly, both of $D\phi L$ and $D\psi L$ have non-increasing characteristics with respect to L.

The elevation angle in surveying is a concept defined with reference to the horizontal plane passing through a focused sampling point, and strictly does not coincident with $\theta$. Furthermore, if the above-ground angle and the underground angle are strictly argued, the curvature of the earth need to be considered and definition I is not always an accurate description. Definition I is a concept defined absolutely on the assumption that the land form analysis is performed through the use of DEM.

While the above-ground angle and the underground angle are concepts with respect to the designated azimuth direction D, the next definition will be introduced as an expanded definition thereof.

Definition II: The above-ground opening and the underground opening of the focused sampling point in the distance L means $$\Phi L=(0\phi L+45\phi L+90\phi L+135\phi L+180\phi L+225\phi L+270L+315\phi L)/8,$$

and $$\Psi L=(0\psi L+45\psi L+90\psi L+135\psi L+180\psi L+225\psi L+270\psi L+315L)/8,$$

respectively.

Here, $0\psi L$, $45\phi L$, $90\phi L$, $135\phi L$, $180\phi L$, $225\phi L$, $270\phi L$, and $315\phi L$ indicate $D\phi L$ values in the respective azimuth directions. Furthermore, $0\psi L$, $45\psi L$, $90\psi L$, $135\psi L$, $180\psi L$, $225\psi L$, $270\psi L$, and $315\psi L$ indicate $D\psi L$ values in respective azimuth directions.

That is, the above definitions of $\Phi L$ and $\Psi L$ mean average values of respective $D\phi L$ and $D\psi L$ values in all the azimuth directions.

The above-ground opening expresses a sky area which can be viewed within the range of the distance L from the focused sampling point, and the underground opening expresses an earth area in the range of the distance L when the earth is viewed in headstand (refer to FIG. 34).

(Explanation of Each Part)

The gradient calculator 108 forms a rectangular mesh of the DEM data in the memory 24, and obtains an average gradient between a focused point on this mesh and the adjacent rectangular planes. Four adjacent rectangles exist and any one thereof is set as a focused rectangle. Then, the elevations and the average gradient of the four corners in this focused rectangle are obtained.

The average gradient is a gradient of a plane which is approximated from four points by the least-square method.

The convex part emphasis image generator 111 includes a first grayscale for expressing a ridge and a valley floor in brightness and, every time the above-ground opening data generator 119 obtains the above-ground opening (average angle: index for determining whether or not to be in a high place, when eight directions are viewed from the focused point in the range of L), calculates brightness corresponding to this above-ground opening $\theta i$.

For example, when the value of the above-ground opening exists in a range of approximately 40 degrees to 120 degrees, 50 degrees to 110 degrees are set corresponding to a first grayscale and allotted to 255 gradations. That is, a higher ridge part (convex part) has a larger above-ground opening and thus expressed in whiter color.

Then, the convex part emphasis image generator 111 reads an above-ground opening image Dp, allocates color data based on the first grayscale to a mesh region having the focused point (coordinates) (when a rectangular mesh is formed for a contour line connecting the same Z values in the DEM data (e.g., 1 m) and any one of the four corners of this mesh is set to the focused point), and stores the allocation result into a memory (above-ground opening image Dp).

Next, a gradation auxiliary unit (not shown in the drawing) of the convex part emphasis image generator 111 reverses the color gradation of this above-ground opening image Dp and stores the result as an above-ground opening image Dp. That is, the above-ground opening image Dp which is adjusted so as to cause the ridge to be expressed in white color is obtained.

The concave part emphasis image generator 112 includes a second grayscale for expressing a valley and a ridge in brightness, and, every time the underground opening data generator 110 obtains the underground opening (average in eight directions from the focused point), calculates brightness corresponding to the value of this underground opening.

For example, when the value of the underground opening exists in a range of approximately 40 degrees to 120 degrees, 50 degrees to 110 degrees are set corresponding to the second grayscale and allotted to 255 gradations.

That is, since a lower valley floor part (concave part) has a larger underground opening value, the color thereof becomes blacker.

Then, the concave part emphasis image generator 112 reads an underground opening image Dq, allocates color data based on the second grayscale to a mesh region having the focused point (coordinates) (when a rectangular mesh is formed for a contour line connecting the same Z values in the DEM data (e.g., 1 m) and any one of the four corners of this mesh is set to the focused point), and stores this allocation result. Next, the color gradation of the underground opening image Dq is corrected.

When the color becomes too black, the color is adjusted to a level of a corrected tone curve. The corrected data is stored (memorized) as the underground opening image Dq.

The gradient emphasis unit 113 includes a third grayscale for expressing the degree of the gradient in brightness, and every time the gradient calculator 108 obtains the gradient (average in four directions from the focused point), calculates brightness of the third grayscale corresponding to this gradient value.

For example, when the value of the gradient ai exists in a range of approximately 0 degrees to 70 degrees, 0 degrees to 50 degrees are set corresponding to the third grayscale and allotted to 255 gradations. Namely, 0 degrees correspond to white and a value larger than 50 degrees corresponds to black. A point having a larger gradient $\alpha i$ is expressed in blacker color.

Then, the gradient emphasis unit 113 stores a difference image between the underground opening image Dq and the above-ground opening image Dp, as a gradient image Dra.

At this time, color data based on the third grayscale is allocated to a mesh region having the focused point (coordinate) (when a rectangular mesh is formed for a contour line connecting the same Z values in the DEM data (e.g., 1 m) and any one of the four corners of this mesh is set to the focused point). Next, red color processing enhances R by a RGB color mode function. That is, a gradient emphasis image Dr in which red is enhanced for a larger gradient is obtained.

By combining the above-ground opening image Dp and the underground opening image Dq by multiplication, the first red synthesis unit 114 obtains a composite image Dh (Dh=Dp+Dq). At this time, balance between both of the data sets is adjusted so as to cause a valley part not to be flat.

The above "multiplication" corresponds to OR operation on numerical treatment in a layer mode word of the Photoshop software.

TABLE 1

| Brightness | Grayscale | i − 1 | i | i + 1 |
|---|---|---|---|---|
| Brighter as higher | Above-ground | 36 | 52 | 45 |
| Darker as higher | Underground | 32 | 48 | 61 |
| | Total | 68 | 100 | 106 |

This balance adjustment cuts out the ground surface in a certain radius (L/2) centered at a certain point, for allocating values between the above-ground opening and the underground opening.

When the whole sky has a uniform brightness, a wide area of the sky viewed upward from the ground surface provides the brightness of the ground.

Namely, the above-ground opening corresponds to the brightness. However, when it is considered that the light intrudes, the value of the underground opening is also taken into account.

Depending on what a ratio is determined between both of the values, it is possible to emphasis a ridge part of the land form and to change the emphasis optionally. When the land form in a valley is to be emphasized, a b value may be increased.

Brightness index=a×above-ground opening–b×underground opening.

Here, a+b=1

Figure 38:
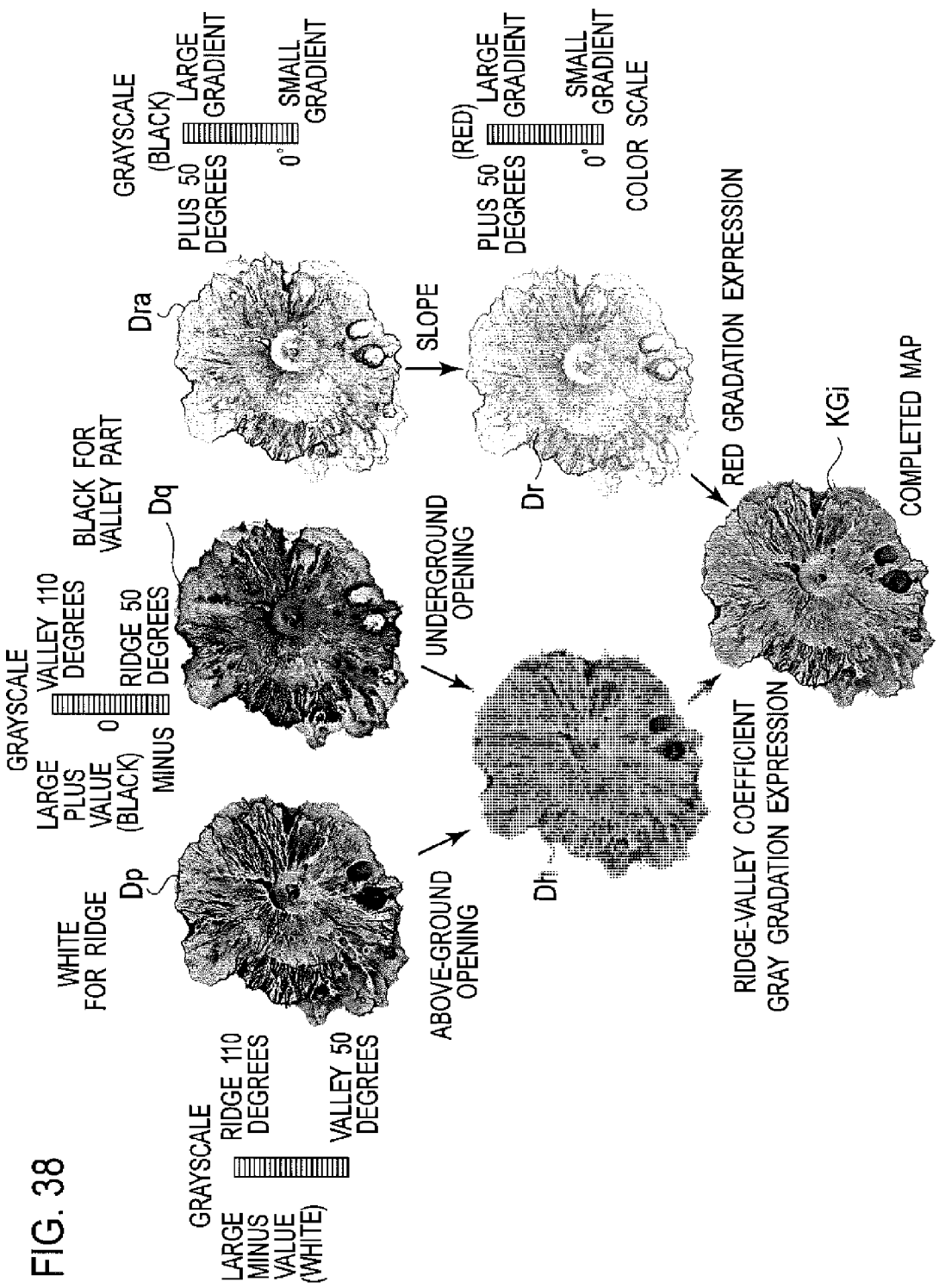
FIG. 38 is an explanatory diagram for generation processing of a slope red three-dimensional image.

That is, as shown in FIG. 38, a composite image having gray color gradation expression combining the above-ground opening image Dp (white emphasis for a ridge) and the underground opening image Dq (black emphasis for a bottom) by multiplication is obtained (Dh=Dp+Dq).

Meanwhile, the second red synthesis unit 115 obtains the red three-dimensional image KGi in which the gradient emphasis image Dr of the file and the composite image Dh obtained by the synthesis in the first red synthesis unit 114 are combined and a ridge is emphasizes by red color, and stores this image into the memory 26.

That is, as shown in FIG. 38, the composite image Dh having a gray color gradation expression is obtained by the combination of the above-ground opening image Dp (white emphasis for a ridge) and the underground opening image Dq (black emphasis for a bottom) by multiplication, and also the gradient emphasis image Dr in which red is enhanced for a larger gradient in the gradient image Dra is obtained.

Then, by the combination of this gradient emphasis image Dr and the composite image Dh, the red three-dimensional image KGi in which a ridge is emphasized by red color is obtained.

Figure 39:
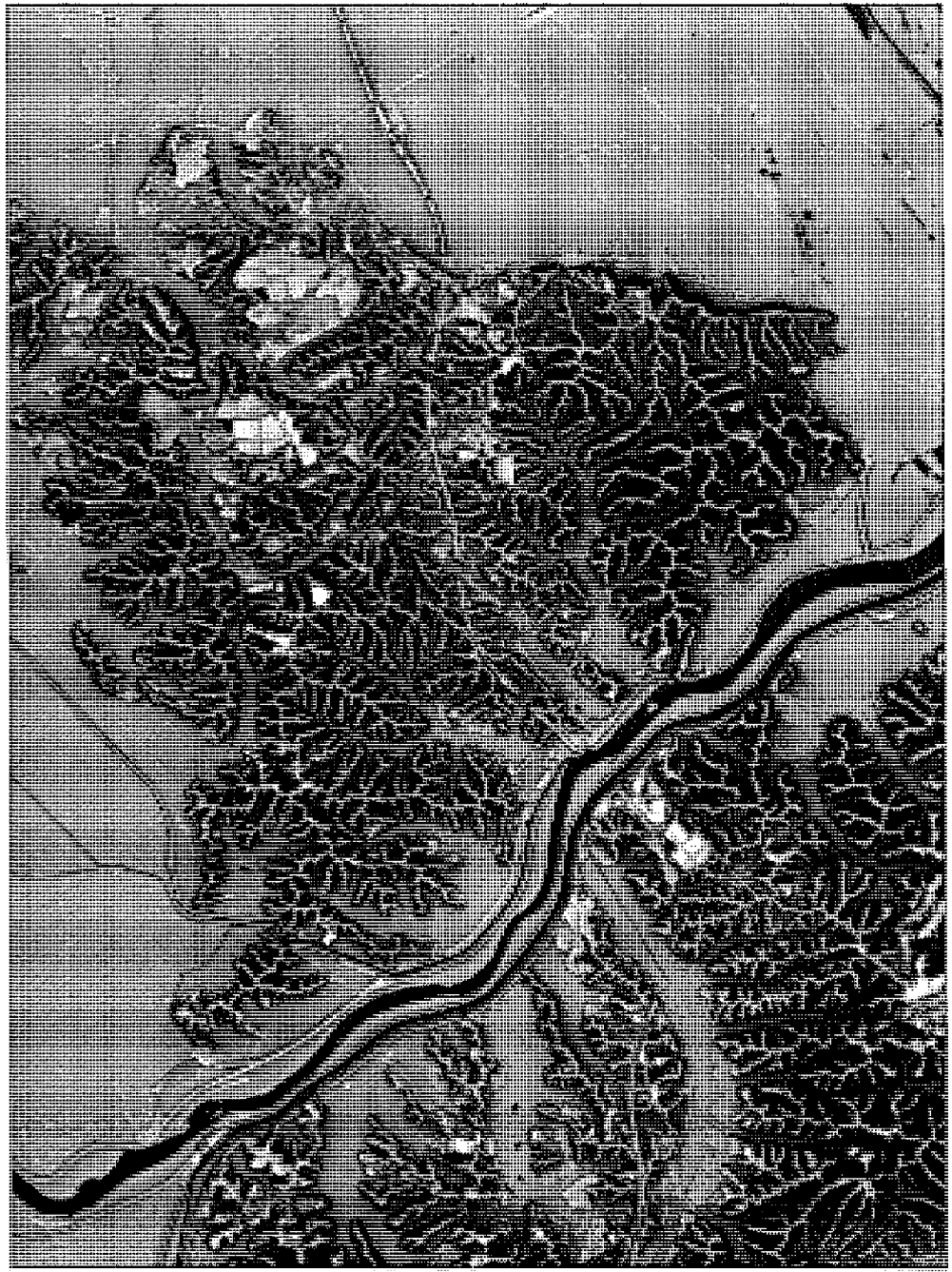
FIG. 39 is an explanatory diagram of another screen example.

Note that, while the above embodiment has been explained through the use of the red three-dimensional image, the red three-dimensional image provided with the Lab color may be used as shown in FIG. 39.

The red three-dimensional image subjected to this Lab color shown in FIG. 39 is generated through the use of the Lab color model. For example, Lab images of the above-ground opening image Dp, the underground opening image Dq, and the gradient emphasis image Dr are obtained by allocating a* channel to the above-ground opening image Dp, allocating b* channel to the underground opening image Dq, and allocating L* channel to the gradient emphasis image Dr.

Then, a composite image (Ki) having combined the above-ground opening image Dp, the underground opening image Dq and the gradient emphasis image Dr, and the Lab images are combined. This image can have excellent three-dimensionality by giving a feeling of less unnaturalness and it is possible to trace a water system on this image.

Furthermore, in the case of a sea-bed map, the map may be a three-dimensional map provided with a color such as blue color, purple color, or green color other than red color, for example.

Figure 40:
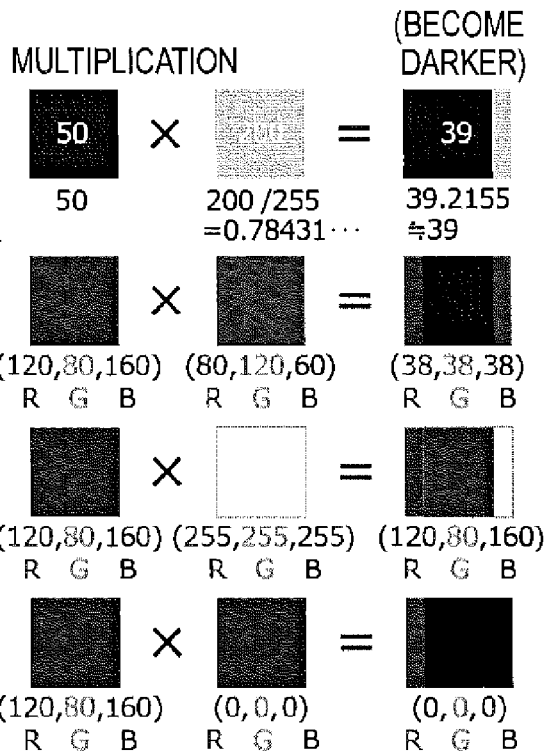
FIG. 40 is an explanatory diagram of RGB color multiplication synthesis.

Moreover, the multiplication combination in the above embodiment is preferably performed as shown in FIG. 40.

The present application claims priority of Japanese Patent Application No. 2012-134869 filed Jun. 14, 2012 and priority of Japanese Patent Application No. 2013-123850 filed Jun. 12, 2013, the content of both of which is incorporated herein by reference.

INDUSTRIAL APPLICABILITY

According to the present invention, it is possible to visualize, with a desired three-dimensional effect, raster images such as a satellite image, an ortho-photo image, a topological map, geological map, and a photograph.

REFERENCE SIGNS LIST 23 mesh size matching unit
25 shading map generator
27 red three-dimensional image generator
30 gradient reader
32 first HSV converter
36 second HSV converter
39 first synthesis unit
41 second synthesis unit
43 third synthesis unit
51 color adjustor

The invention claimed is:

1. A raster image three-dimesionalization processing device, comprising:
   a first storage configured to store Digital Elevation Model (DEM) data;
   a second storage configured to store a raster image of a region where the DEM data is obtained;
   a display; and
   a processor, including
   (A) a unit configured to match a mesh size of the DEM data with a mesh size of the raster image;
   (B) a unit configured to obtain an above-ground opening image, an underground opening image, and a slope emphasis image in which a more enhanced color is allocated for a larger gradient value, from the DEM data, and obtain a three-dimensionally visualized image which combines these images;
   (C) a unit configured to read a floating-sinking degree which is a parameter when the above-ground opening image and the underground opening image are obtained, and read a gradient when the slope emphasis image is obtained;
   (D) a first hue-saturation-value (HSV) conversion unit configured to convert the floating-sinking degree and the gradient into brightness (Va) and saturation (Sa), respectively, while fixing hue (H) to "0", and output a conversion result as a first conversion image;
   (E) a second HSV conversion unit configured to subject the raster image to HSV conversion and output a conversion result as a second conversion image;
   (F) a unit configured to read the hue (H) of the second conversion image and obtain a first color composite image which combines this hue (H) and the first conversion image; and
   (G) a unit configured to generate a second color composite image which combines the first color composite image and the second conversion image, and display the second color composite image on a screen of the display.

2. The raster image three-dimensionalization processing device according to claim 1, further comprising the processor including:
   (H) a unit configured to display, on the screen, a color adjustment value input screen causing HSV values of the first color composite image and HSV values of the second color composite image to be input;
   (I) a unit configured to set the HSV values of the first color composite image input into the color adjustment value input screen, to the first HSV conversion unit, and also set the HSV values of the second color composite image input into the color adjustment value input screen, to the second HSV conversion unit; and
   (J) a unit configured to activate the (A) to (G) units in response to the setting.

3. The raster image three-dimensionalization processing device according to claim 1, further comprising the processor including:
- (K) a unit configured to generate a shading image of the DEM data; and
- (L) a unit configured to combine the shading image with the saturation (Sb) and the brightness (Vb) of the second conversion image, to thereby form a second conversion image.

4. The raster image three-dimensionalization processing device according to claim 1, wherein
the three-dimensionally visualized image is a red three-dimensional image in which more enhanced red color is allocated to a larger gradient value and bright color is allocated to a ridge.

5. A raster image three-dimensionalization method, comprising:
preparing
- a first storage configured to store Digital Elevation Model (DEM) data;
- a second storage configured to store a raster image of a region where the DEM data is obtained;
- a display, and
- a processor, and causing the processor to perform
- (A) matching a mesh size of the DEM data with a mesh size of the raster image;
- (B) obtaining an above-ground opening image, an underground opening image, and a slope emphasis image in which a more enhanced color is allocated for a larger gradient value, from the DEM data, and obtaining a three-dimensionally visualized image which combines these images;
- (C) reading a floating-sinking degree which is a parameter when the above-ground opening image and the underground opening image are obtained, and reading a gradient when the slope emphasis image is obtained;
- (D) first hue-saturation-value (HSV) converting the floating-sinking degree and the gradient into brightness (Va) and saturation (Sa), respectively, while fixing hue (H) to "0", and outputting a conversion result as a first conversion image;
- (E) second HSV subjecting the raster image to HSV conversion and outputting a conversion result as a second conversion image;
- (F) reading the hue (H) of the second conversion image and obtaining a first color composite image which combines this hue (H) and the first conversion image; and
- (G) generating a second color composite image which combines the first color composite image and the second conversion image, and displaying the second color composite image on a screen of the display.

6. The raster image three-dimensionalization method according to claim 5, further comprising causing the processor to perform:
- (H) displaying, on the screen, a color adjustment value input screen causing HSV values of the first color composite image and HSV values of the second color composite image to be input;
- (I) setting the HSV values of the first color composite image input to the color adjustment value input screen, to the first HSV converting, and also setting the HSV values of the second color composite image input to the color adjustment value input screen, to the second HSV subjecting; and
- (J) executing (A) to (G) in response to the setting.

7. The raster image three-dimensionalization method according to claim 5, further comprising causing the processor to perform:
- (K) generating a shading image of the DEM data; and
- (L) combining the shading image with the saturation (Sb) and the brightness (Vb) of the second conversion image, to thereby form a second conversion image.

8. The raster three-dimensionalization method according to claim 5, further comprising causing the processor to perform:
the three-dimensionally visualized image to be a red three-dimensional image in which more enhanced red color is allocated to a larger gradient value and bright color is allocated to a ridge.

* * * * *